(12) United States Patent
Harper et al.

(10) Patent No.: US 9,483,814 B1
(45) Date of Patent: Nov. 1, 2016

(54) METHODS AND APPARATUS FOR THE FILTERING OF SPATIAL FREQUENCIES

(71) Applicants: George Finley Harper, Weston, MA (US); Todd Hutchinson Snyder, Hopkinton, MA (US)

(72) Inventors: George Finley Harper, Weston, MA (US); Todd Hutchinson Snyder, Hopkinton, MA (US)

(73) Assignee: Bulldog Software LLC, Weston, MA (US)

( * ) Notice: Subject to any disclaimer, the term of this patent is extended or adjusted under 35 U.S.C. 154(b) by 0 days.

(21) Appl. No.: 14/660,908

(22) Filed: Mar. 17, 2015

Related U.S. Application Data

(60) Provisional application No. 61/954,391, filed on Mar. 17, 2014.

(51) Int. Cl.
*G06T 5/20* (2006.01)

(52) U.S. Cl.
CPC ....... *G06T 5/20* (2013.01); *G06T 2207/20024* (2013.01)

(58) Field of Classification Search
None
See application file for complete search history.

(56) References Cited

U.S. PATENT DOCUMENTS

| 9,076,231 B1* | 7/2015 | Hill | G06T 3/4023 |
| 9,264,463 B2* | 2/2016 | Rubinstein | H04L 65/403 |
| 2015/0033366 A1* | 1/2015 | Guffrey | H04W 4/206 726/29 |
| 2015/0302600 A1* | 10/2015 | Kreder, III | G06K 9/34 382/283 |
| 2015/0371613 A1* | 12/2015 | Patel | G06F 21/10 345/549 |
| 2016/0012625 A1* | 1/2016 | Schnelle | G06T 11/60 345/551 |

* cited by examiner

*Primary Examiner* — Sean Motsinger
(74) *Attorney, Agent, or Firm* — Kaplan IP Law, PLLC; Jonathan T. Kaplan

(57) ABSTRACT

A single still input image is converted into a decomposition video that, when played, appears to be a close facsimile of the input image. Each frame of the decomposition video has a subset of the pixels of the input image that is disjoint from the subset of pixels selected for any other frame. A union of the subsets, represented by each decomposition video frame, contains all the pixels of the input image. To preserve sufficient brightness, a decomposition video generally needs to contain a relatively small number of frames. To achieve effective and efficient blocking, of the content of the input image as it appears in each frame of a decomposition video, the present invention focuses upon a spatial filtering strategy and, preferably, a two-tiered strategy. A first tier focuses upon the obscuring of relatively high frequency spatial frequencies, while a second tier focuses upon the obscuring of relatively low frequency spatial frequencies.

12 Claims, 17 Drawing Sheets

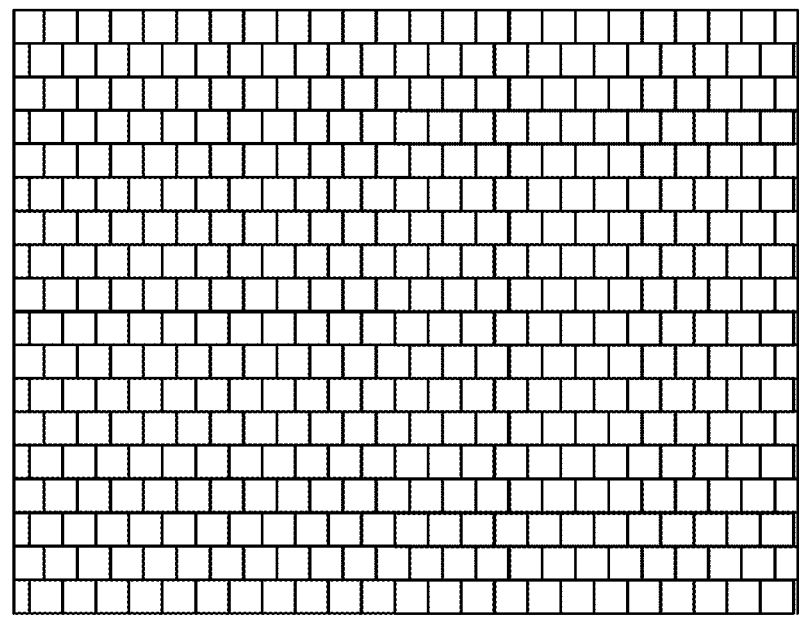
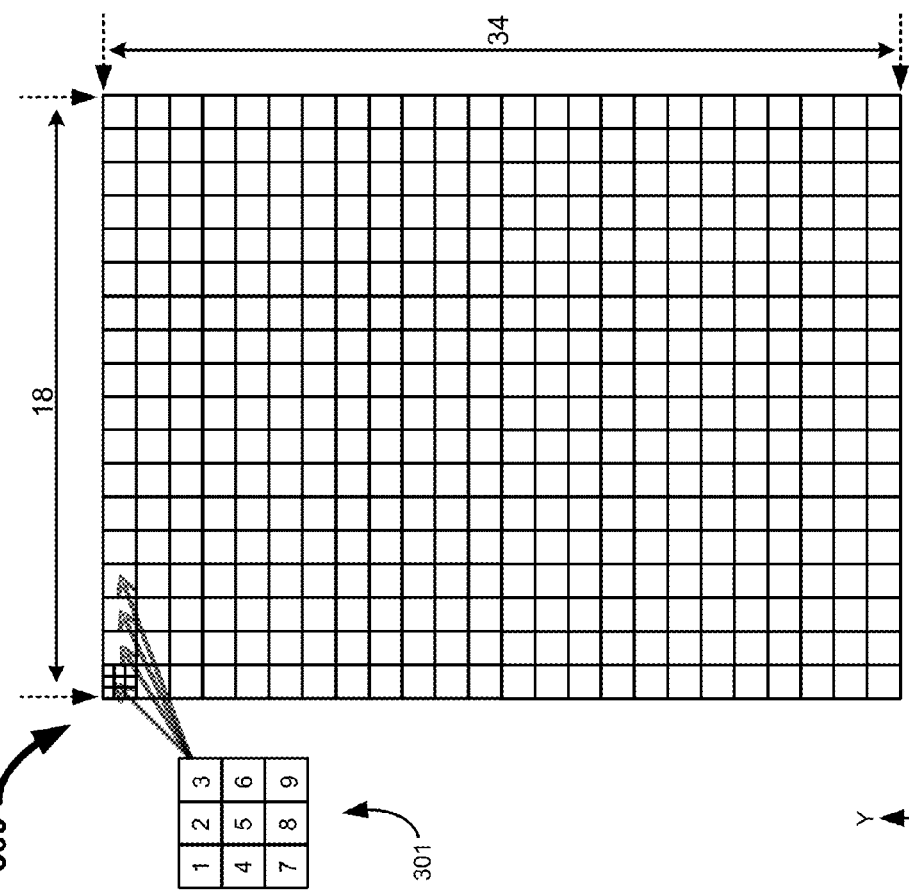

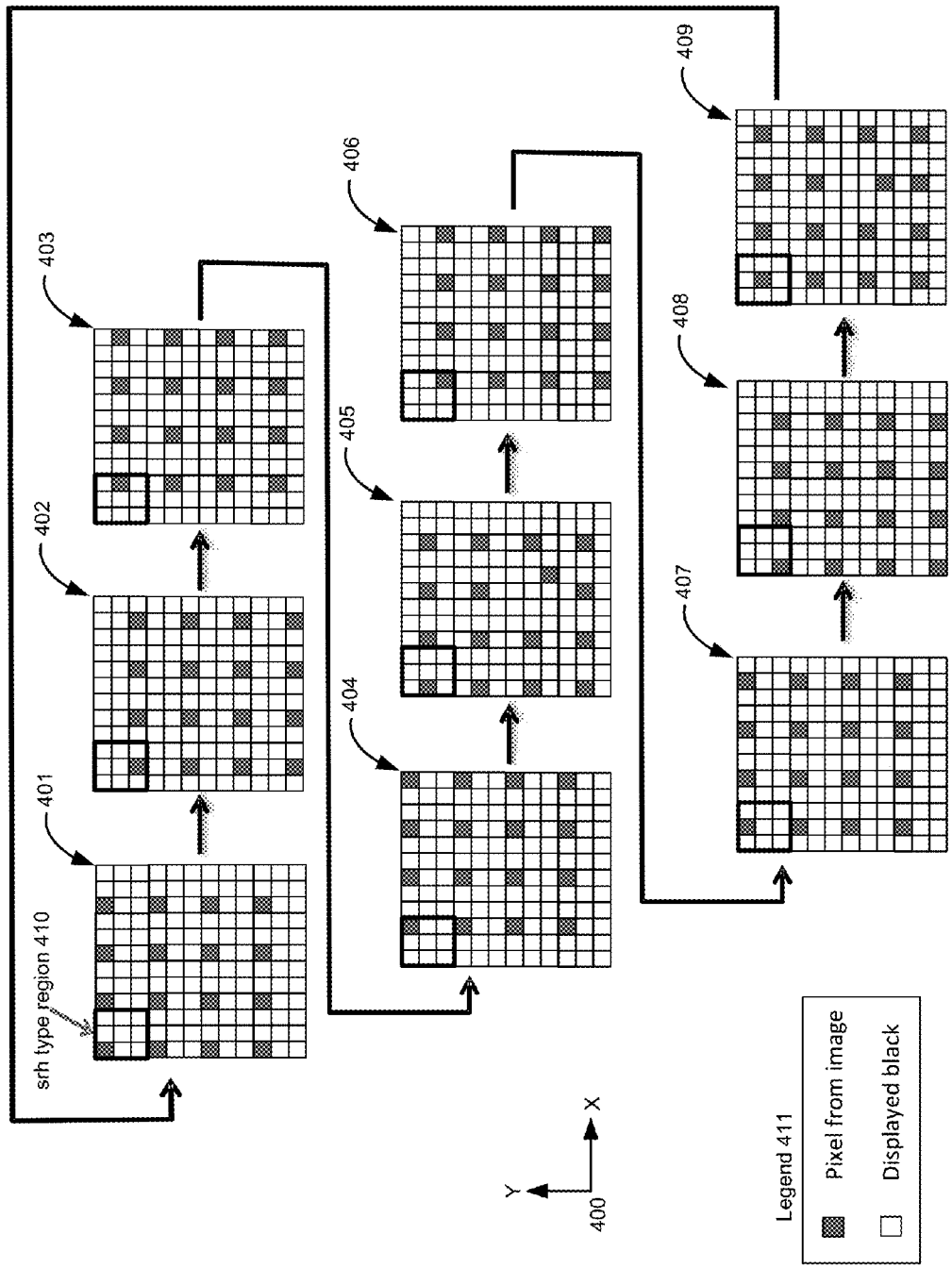

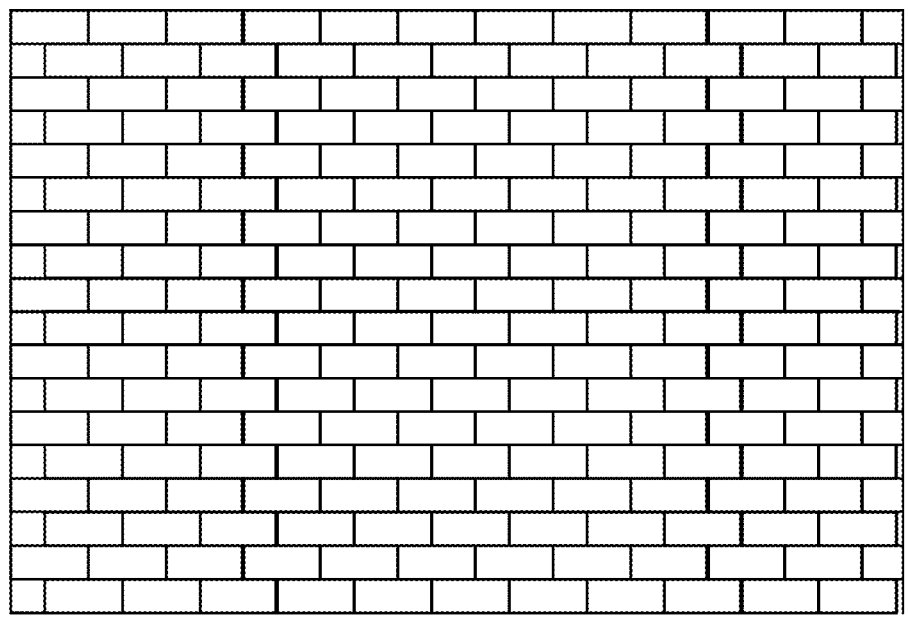
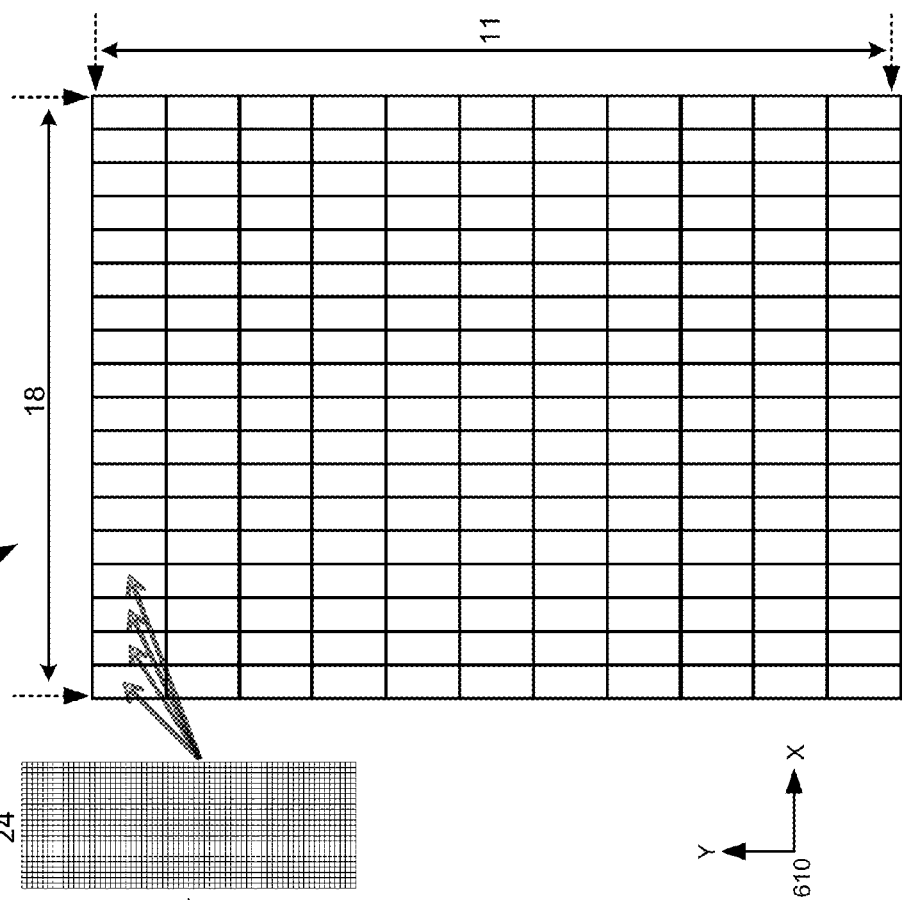
FIGURE 6B
FIGURE 6A

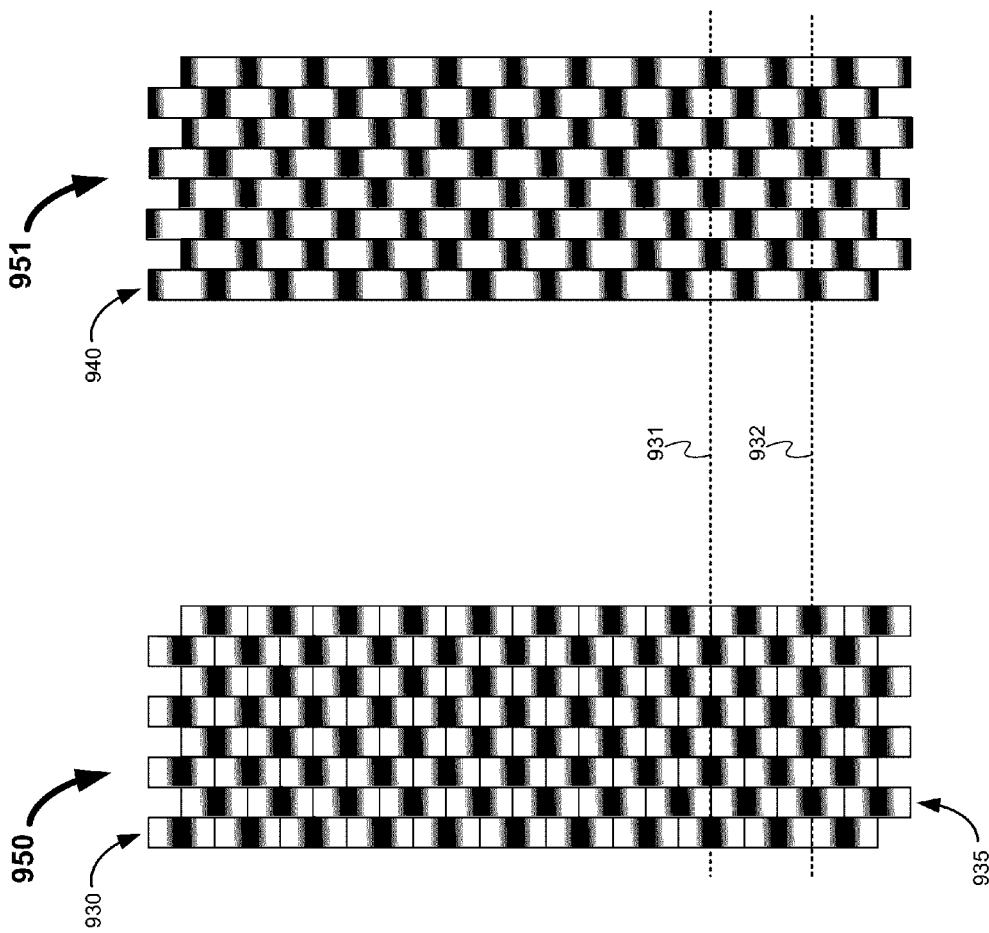

FIGURE 10A

```
1   /* Each time this procedure is called, a single frame, of the pair of frames produced for each srl, is displayed.
2    * First call is regarded as "even" (numbered 0, 2, 4, ...), and second call is treated as "odd" (numbered 1, 3, 5, ...). */
3   display_frame()
4   {
5     if (first_time) {
6       /* display_even_frame keeps the state, of what happened to a vixel on the last even frame.
7        * Set state to indicate all vixels as NOT displayed in last even frame. */
8       display_even_frame[x, y] = FALSE;
9       /* Set mask to opaque for all vixels (meaning corresponding vixel displayed as black). */
10      mask[x, y] = OPAQUE;
11    } /* end if first time */
12
13    /* Get pseudo-random vixel number in srl (repeat same vixel number across each pair of frames) */
14    srl_current_vixel = select sequentially and in loop from: {0,0,7,7,5,5,6,6,1,1,8,8,3,3,2,2,4,4};
15
16    /* Go through all vixels of a frame, by row from top to bottom */
17    for (y indicating each vixel-row) {
18      /* Go through all vixels of a frame, by column from left to right */
19      for (x indicating each vixel in the row y, from left to right) {
20
21        /* Get virtual row number of current vixel, within the current srl */
22        virtual_srl_row = calculate row number from top of current srl, as indicated by x, y;
23
24        /* Based on position of current virtual row of current srl, with respect to probability function assigned to each srl,
25         * For purposes of example, probability function used is shape of sawtooth: goes from 0.0 to 1.0, and then
26         * back to 1.0. */
27        probability_virtual_row = based on position of virtual_srl_row, with respect to sawtooth of current srl;
28
29        /* likelihood_to_accept is assigned a value in the range of 0 to 100. likelihood_to_accept represents the
30         * likelihood of accepting the next die roll, where accepting a die roll means the current vixel, as indicated by
31         * x and y, is displayed */
32        likelihood_to_accept = probability_virtual_row * 100;
33
                          . . .
```

```
1   /* Test whether current frame to be displayed is even or odd. */
2   if (even frame) {
3
4   /* If it is TRUE that current vixel was NOT displayed in last even frame, then it was displayed in last odd frame,
5    * so "clean up" mask, from display of last pair of frames, by reseting mask to OPAQUE. */
6   if (!display_even_frame[x, y]) {
7       mask[x, y] = OPAQUE;
8   }
9
10  /* Roll "die," by setting it to a pseudo random value, from the range of 0 to 99. */
11  die = select pseudo-randomly from: {0, 1, 2, ... 99};
12  if (die < likelihood_to_accept) {
13      /* Based on x, y, determine position of current vixel within current srh. */
14      virtual_srh_position = calculate, from x, y, current srh and position of x, y relative to current srh;
15
16      /* If current vixel corresponds to a position, within the current srh, that is selected-for across current pair of
17       * frames, then set mask so that this vixel of input image can be displayed. */
18      if (virtual_srh_position == srh_current_vixel) {
19          mask[x, y] = TRANSPARENT;
20      }
21  } /* end of: die < likelihood_to_accept */
22
23  } /* end if even frame
24
```

```
1
2   /* Otherwise, current frame to be displayed is odd frame of the current pair. */
3   else {
4       /* If current vixel was not displayed on first (or even) frame of pair
5       if (!display_even_frame[x, y]) {
6           /* Based on x, y, determine position of current vixel within current srh. */
7           virtual_srh_position = calculate, from x, y, current srh and position of x, y relative to current srh;
8
9           /* If current vixel corresponds to a position, within the current srh, that is selected for across current pair of
10          * frames, then set mask so that this vixel of input image can be displayed. */
11          if (virtual_srh_position == srh_current_vixel) {
12              mask[x, y] = TRANSPARENT;
13          }
14      }
15      /* Otherwise, current vixel was displayed on first (or even) frame of pair -- so don't display it now! */
16      else {
17          mask[x, y] = OPAQUE;
18      } /* end: don't display it now! */
19  } /* end if odd frame
20
21
22      } /* end x loop */
23  } /* end y loop */
24
25  /* Now the correct mask, by which to display the current frame, has been created.
26   * Go ahead and display the input image, by displaying input_imaged ANDed, on vixel-by-vixel basis, with mask */
27  go_display_frame();
28
29  } /* end display frame
```

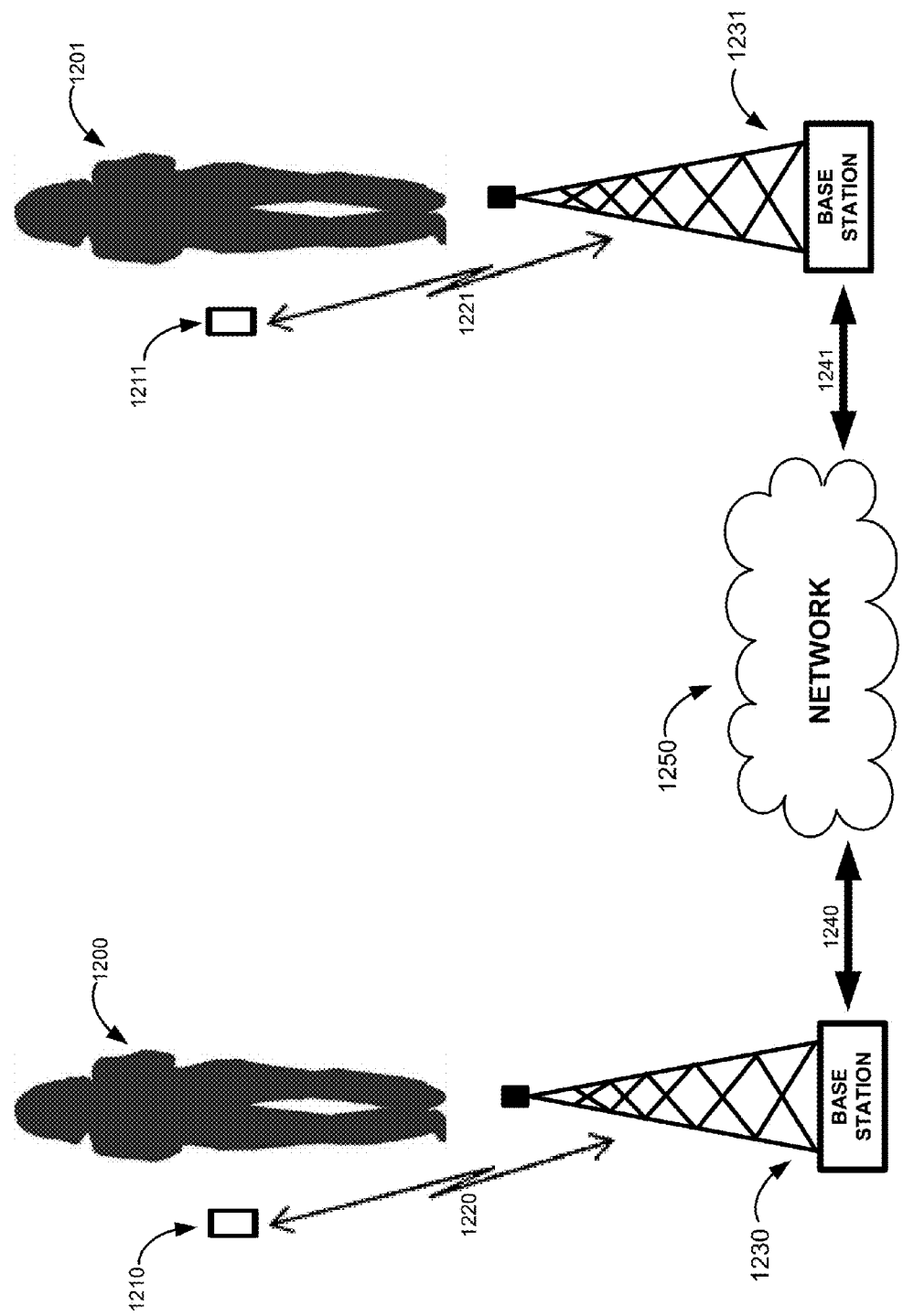

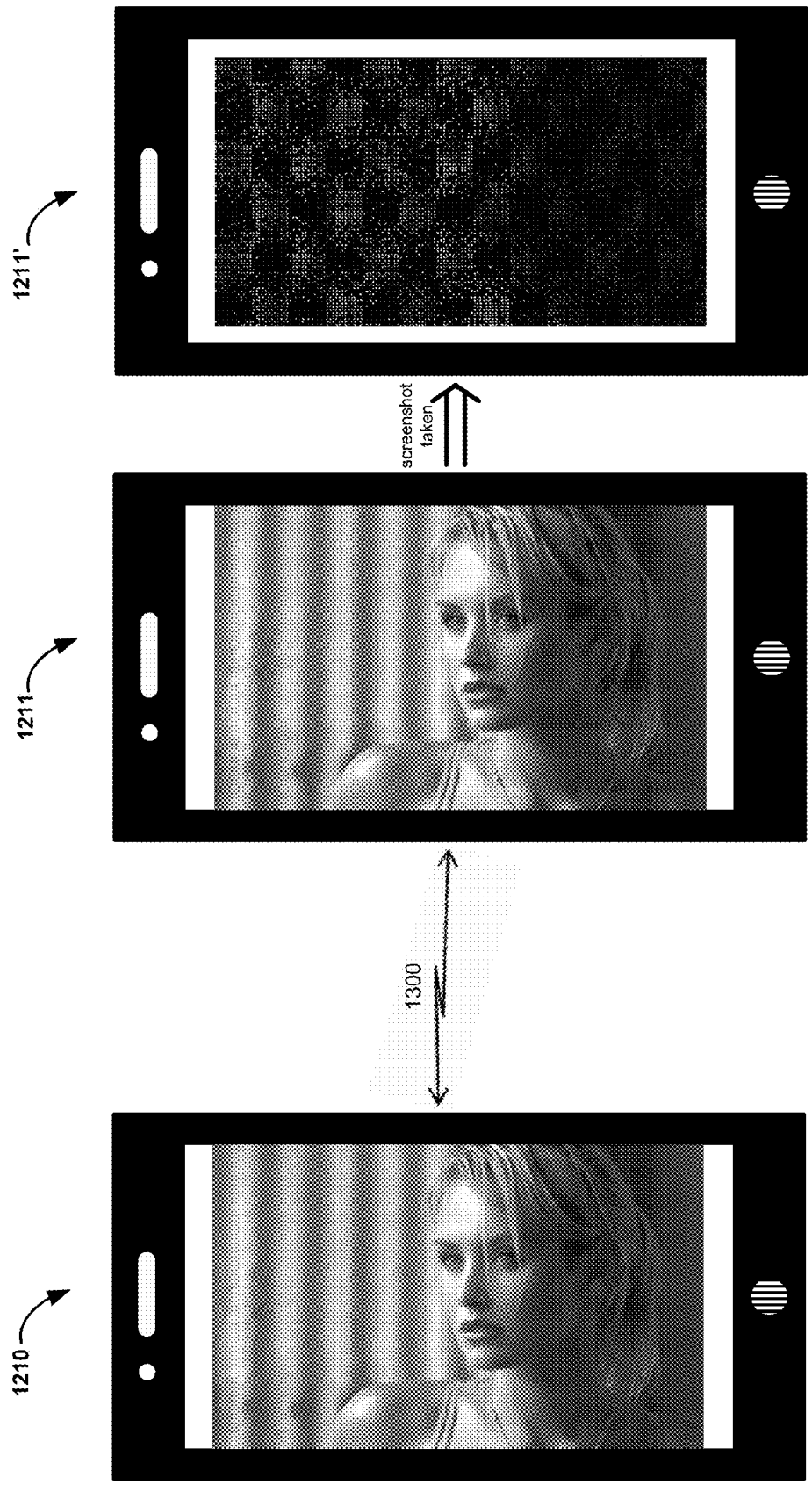

METHODS AND APPARATUS FOR THE FILTERING OF SPATIAL FREQUENCIES

As provided for under 35 U.S.C. §119(e), this patent claims benefit of the filing date of the following U.S. Provisional Application, herein incorporated by reference in its entirety:

"Segmenting a Visual Image into a Plurality of Micro-Areas for Sequential Viewing," Application No. 61954391, filed 2014 Mar. 17 (y/m/d), George Harper (Applicant and inventor).

FIELD OF THE INVENTION

The present invention relates generally to the filtering of spatial frequencies, and, more particularly, to the decomposition of images.

BACKGROUND OF THE INVENTION

Approximately 175 years ago, the first technologies for the capture and reproduction of individual still images were developed (e.g., the Daguerreotype process). Such technology, called "photography," was based on photosensitive and irreversible chemical reactions. Then, approximately 125 years ago, technologies were developed to capture and reproduce scenes with motion—so-called "motion pictures."

A motion picture camera relies upon the capture of a quick succession of still images, while recording the original scene. For example, the sequence of still images can be captured at a rate of approximately 30 per second. The sequence of still images is then chemically developed, using essentially the same technology by which photographic still images had been produced. The images captured are then displayed in the same sequence, and at the same speed, at which they had been captured. It was found that this sequential display of images is experienced, by the human visual system, as something very similar to a still image—except the "picture" also reproduced, realistically, motion present in the original scene.

These two technologies, photography and motion pictures, represented the foundation of visual media. More generally, we can refer to photography as the foundation, and initial technological platform, for what we can refer to as "still image visual media." Similarly, we can refer to motion pictures as the foundation, and initial technological platform, for what we can refer to as "moving image visual media." Since the introduction of still image and moving image visual media, and until about 20 years ago (i.e., a period of about 100 years), the development of these two types of media can be characterized as being almost exclusively focused on the following two broad goals:
  Improving the channels, by which such visual media can be distributed (e.g., making the distribution faster, and less expensive).
  Improving the visual quality of the visual media (e.g., adding the ability to reproduce color, and improving resolution).

The last 20 years of visual media development can be differentiated from the previous 100 years by the confluence of two new developments:
  Widespread availability of computer networking technologies (e.g., the Internet, along with the various wired and wireless mediums by which to achieve connectivity).
  Widespread availability of digital imaging technologies, for both still image and moving image visual media.

The confluence of these two developments has resulted in something of a revolution, with regard to visual media, that can be referred to herein as the "digital imaging revolution."

The digital imaging revolution has so successfully satisfied the long-term goals listed above (distribution that is rapid and inexpensive; images distributed are of high-quality), that privacy and control have now become major concerns.

Other than its capacity to act as a phone (a capability that continues to become less and less important), the so-called "smart phone" is really a powerful and pocket-sized computer. They are almost always equipped with a camera, that can take still images or video. Any images or video captured can then be distributed, very quickly, because almost all smart phones are now provided with a ubiquitous, and relatively high speed, Internet connection.

In sum, a smart phone delivers a kind of capacity, for the creation and distribution of visual media, which, just 35 years ago, would require the facilities of a television network studio.

Like any major brand of computer, a smart phone can be loaded with a wide variety of application software (with such application software, in smart phone jargon, generally referred to as "apps").

The increasing concern among smart phone users, regarding privacy and control, is evidenced by the popularity of apps that attempt to make visual media sharing more ephemeral and temporary. For example, the app SNAPCHAT is extremely popular. A major feature of Snapchat is that the pictures shared through it can only be seen for a limited time period, and are then automatically deleted.

However, there can be a serious vulnerability for such privacy-enhancing apps. The operating system (OS), of essentially all smart phones, includes a capability for the taking of "screenshots." Because the screenshot facility is provided at the OS level, it is available to a smart phone user regardless of the particular app, he or she may be using.

Thus, even if an app (e.g., Snapchat) deletes an image shortly after it becomes viewable, the recipient of the image can take a screenshot of the picture, and thereby circumvent the intended privacy and control. The screenshot facility is of particular concern on smart phones that run APPLE's iOS, because, under iOS, apps cannot disable the screenshot facility.

It would therefore be desirable to be able to control the display of images, such that the screenshot facility is a lesser vulnerability, for privacy and control.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 3A depicts how an srh type regions can be arranged as a matrix.

FIG. 3B is the same as FIG. 3A, except that alternating columns of srh type regions are shifted relative to each other.

FIG. 4 depicts in much greater detail, how one small portion of FIG. 3A can operate, with respect to utilization of its srh type regions.

FIG. 6A shows vixel matrix 500, and how it can be repeated across an input image.

FIG. 6B depicts the fact that the lower-frequency blocking of srl type regions can be enhanced by shifting alternating columns.

FIG. 9C shows an example of how columns of srl-type regions can be repeated, in order to perform lower-frequency spatial frequency filtering across an entire input image.

FIGS. 10A-10C present an example pseudo-coded implementation, that utilizes both srh-level and srl-level of spatial frequency filtering.

FIG. 12 depicts a typical usage scenario, where a person 1200 wishes to communicate a photograph to person 1201.

FIG. 13 continues with this usage scenario of FIG. 12, by showing close-up views of smart phones 1210 and 1211.

DETAILED DESCRIPTION OF PREFERRED EMBODIMENTS

Figure 1A:
FIG. 1A represents an example decomposition video of an input image, as it could be seen on the screen of a smart phone.

Reference will now be made in detail to various embodiments of the invention, examples of which are illustrated in the accompanying drawings. Wherever possible, the same reference numbers will be used throughout the drawings to refer to the same or like parts.

Please refer to Section 8 ("Glossary of Selected Terms"), included as the last section of the Detailed Description, for the definition of selected terms used below.

Table of Contents to Detailed Description

1 Introduction
2 First Embodiment
3 Spatial Frequency Filtering
  3.1 Overview
  3.2 Higher-Frequency Spatial Filtering
  3.3 Lower-Frequency Spatial Filtering
4 Pseudo-Coded Implementation
5 Further Variations
6 Use Case Scenarios
7 Hardware Implementation
8 Glossary of Selected Terms 1 Introduction The present invention is focused on the goals of preserving privacy and/or control of still image visual media. A single still image, to which the present invention may be applied, can be referred to herein as the "input image."

A primary technique, by which the present invention accomplishes this, is by converting the input image into a form that resembles moving image visual media. In particular, the single input image is decomposed into a short sequence of frames, that can be referred to herein as the "decomposition video." The decomposition video is designed such that, when played at a frame rate typical of moving image visual media, it appears to be a close approximation of the original input image.

However, each frame of the decomposition video contains only a portion of the visual information that was present in the original input image. For example, if an intended viewer of the input image attempts to take a screenshot of the decomposition video, he or she will capture only one frame of the video. All frames of the decomposition video are designed such that, when any of them is viewed singly, it is very difficult perceive any of the visual information present in the input image.

When played as a video, the decomposition video achieves its intended effect, of presenting a close approximation to the input image, by using properties of the human visual system similar to those responsible for a lack of "flickering," and the perception of motion, in moving image visual media. However, in contrast to conventional moving image visual media, the net purpose of a decomposition video is to achieve an opposite effect: it is to present the appearance of a single static image, rather than the appearance of movement.

Currently, moving image visual media has a frame rate in the range of approximately 20 frames per second to approximately 120 frames per second, with a typical current frame rate, for smart phones, being 60 frames per second (or "fps"). However, while the present invention requires at least a minimum frame rate, to present the appearance of a smooth and non-flickering image, there is essentially no upper limit on the frame rate to which these techniques are applicable.

While the physiological and neurological basis for moving image visual media has been understood for some time, prior to the currently still-ongoing digital imaging revolution, there was never a need to even consider whether such basis could be used as a way to degrade distribution, and degrade image quality, with respect to visual media content.

Figure 1B:
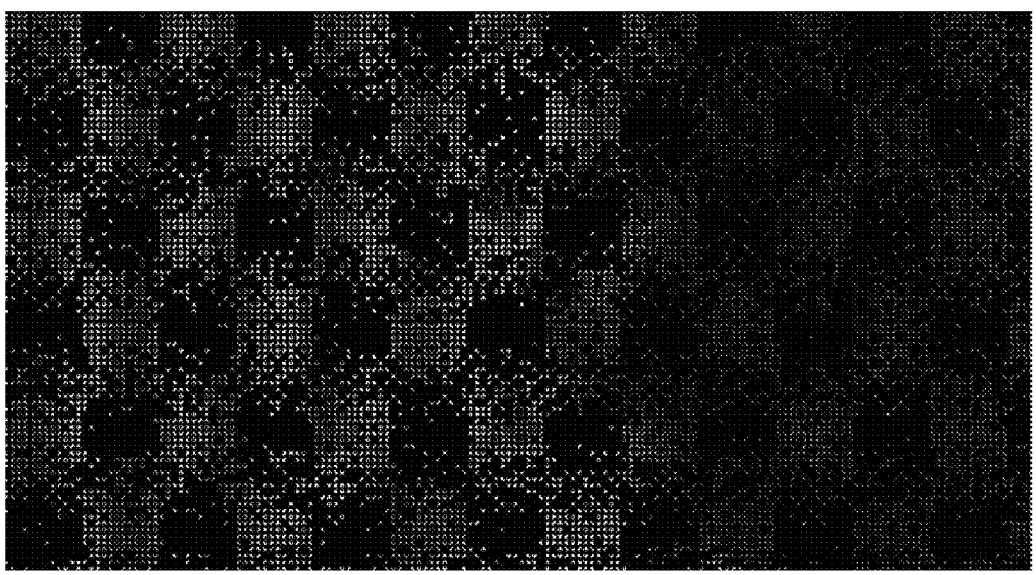
FIG. 1B depicts a display of just one of the frames of the decomposition video of FIG. 1A.

Before going into further detail, on how the present invention can be implemented, it is useful to show an actual example of the kind of result that can be achieved, by applying a particular embodiment of the invention to a particular input image. FIG. 1A represents an example decomposition video of an input image, as it could be seen on the screen of a smart phone, if the decomposition video is being played as a continuous loop, and at a suitably high frame rate (e.g., that is being played at 60 fps). While the image of FIG. 1A appears to be just a normal still image, displayed with conventional techniques, it is actually the perceived result, as experienced by the human visual system, of an eight frame decomposition video. In order to produce this decomposition video, an original input image (not shown) was subjected to a decomposition procedure, constructed in accordance with the principles of the present invention. (The input image is not shown since its appearance would be very similar to that of FIG. 1A.) FIG. 1B, in contrast, depicts a display of just one of the eight frames of the decomposition video (where the frame is being displayed as a still image with conventional techniques). Therefore, if a person is viewing the image of FIG. 1A on his or her smart phone, and then attempts to capture a screenshot of the image, the screenshot captured would only contain the image of FIG. 1B.

It should be noted that while the example image of FIG. 1A is shown in grey scale, the present invention is fully applicable to color images as well.

2 First Embodiment

In the following discussion, the number of frames to be produced, for a decomposition video, can be referred to as "dv_nf." A maximum value for dv_nr (i.e., a maximum number of frames that can be included in a decomposition video), if it has been determined, can be referred to as "dv_max."

For the decomposition procedures described herein, all seek to produce a decomposition video that has at least the following two key characteristics:

- It displays, across its dv_nf frames, all pixels present in the input image. In other words, a union of the pixels present, in all the frames of the decomposition video, contains all the pixels of the input image.
- It displays, for each of the dv_nf frames, a subset of the pixels in the input image. Each of the dv_nf subsets is selected such that it is disjoint, from any of the other (dv_nf−1) pixel subsets.

A primary constraint on determining a suitable decomposition video, is preserving, in the reproduction of the input image, suitable image brightness. This constraint places an upper limit, on the number of frames that can be included in a decomposition video. By way of example, using current APPLE iPhone technology, it has been experimentally determined that a suitable value for dv_max is approximately 30.

The centrality of preserving sufficient image brightness, as a constraint upon maximum decomposition video length, can be understood from the following example. For a decomposition video that is to consist of 30 frames (i.e., dv_nf=30), the two key characteristics, of the decomposition video to be produced, can be stated as follows:

- To display, across the 30 frames, all pixels present in the input image.
- To display, for each of the 30 frames, a subset of the pixels in the input image. Each of the 30 subsets is selected such that it is disjoint, from any of the other 29 pixel subsets.

When measured over a sufficiently long time period, that we can refer to as "M," the time during which each frame of a decomposition video is displayed (if it is constructed to satisfy the above-two key goals) is:

$$\frac{1}{30} \times M.$$

It is also worm noting that i since each frame displays a disjoint set of pixels, this is equivalent to saying that each pixel of the input image is displayed for $$\frac{1}{30} \times M.$$

During the $$\frac{29}{30} \times M$$

time period, when each pixel is not to be displayed, experimentally, it has been found best to simply leave the pixel completely "off" or "black." (However, in general, during the time period when each pixel is not displaying information from the input image, it should be kept at a level that permits maximally smooth and seamless stitching together, of the frames of the decomposition video, as experienced by the human visual system.)

This small fraction of the display time M, during which each pixel displays information from the input image, is in marked contrast to conventional digital display techniques, where every pixel is displayed throughout all of (or at least a majority of) time period M.

To provide an even more concrete example, consider the conventional display of an input image, where it is displayed continuously, and for a time period equal to one 1.0 sec. (Please see below Glossary, for a discussion of the terminology used herein, for reference to time periods in seconds.) In comparison, consider a decomposition video that produces a close facsimile of the same input image, and which consists of 30 frames, played at a frame rate of 30 fps. In this case, each pixel of the decomposition video is active for $$\frac{1}{30}$$

sec. (or approximately 0.033 sec.).

The conventional parameters by which to measure improvement, in digital video displays, is higher frame rates and/or greater numbers of pixels per image. Unfortunately, neither of these parameters is relevant to increasing the maximum number of frames possible in a decomposition video. With regard to increased frame rates, its lack of effect can be understood by referring to the concrete example discussed just above. Increasing the frame rate in that example, from 30 fps to 60 fps, just means that the 30 frames of the decomposition video can be cycled through two times per second, with each frame appearing twice, for $$\frac{1}{60}$$

sec., rather than once, for $$\frac{1}{30}$$

sec. Adding together the two frame times still results in a total display for a frame, during each second of display, of $$\frac{1}{30}$$

sec.

The upper limit (or, as discussed above, dv_max), on the number of frames in a decomposition video, can be increased by other factors, such as by increasing a display's maximum luminosity. However, this would likely mean that, during conventional still image display, only a fraction of the display's luminance capability is utilized (otherwise the displayed image would likely appear too bright). Conversely, the full resolution of a display's luminosity scale can be utilized during conventional still image display, but, for display of a decomposition video, the range of luminosities can be compressed into the upper range of the display's luminosity resolution.

Despite there being some opportunities for increasing the upper limit, in general, one can be expected to be limited, in a decomposition video, to a relatively small number of frames. This number is particularly small, when compared to the large amount of visual information that can be present in an input image. This means that, as a first major goal, a very effective and efficient decomposition procedure is needed. A decomposition procedure is regarded as effective, to the extent that, for each frame of the decomposition video, it is difficult, for the human visual system, to perceive content that was present in the input image. A first decomposition procedure is regarded as efficient, compared to a second decomposition procedure, to the extent that the first procedure can achieve a same or greater level of effectiveness (than the second procedure) with a decomposition over fewer frames.

To achieve effective and efficient blocking, of the content of the input image as it appears in each frame of a decomposition video, the present invention focuses upon the use of, at least, a two-tiered spatial filtering strategy. A first tier of spatial filtering focuses upon the blocking (or obscuring) of relatively high frequency spatial frequencies, as they may have been present in the input image. A second tier of spatial filtering focuses upon the blocking (or obscuring) of relatively low frequency spatial frequencies, as they may have been present in the input image. Between the blocking of the high frequencies and the low frequencies, each frame, of the decomposition video, has relatively few spatial frequencies left, that are still capable of perception, by the human visual system, in a way that will correspond to information present in the original input image.

Depending upon the content of the particular input image, however, it can be the case that even a single tier of spatial frequency filtering (either high-frequency blocking or low-frequency blocking) will achieve a sufficient level of privacy and/or control.

In addition to achieving the above-described first major goal (i.e., effectiveness with efficiency), the decomposition procedure also needs to achieve a second major goal: relatively smooth and seamless stitching together of the frames of the decomposition video, by the human visual system, when the decomposition video is actually played. This second major goal can be summarized as seeking to have the decomposition video, as closely as is possible, duplicate the appearance of the original input image when displayed with conventional techniques.

It is the need to achieve both the above-described first and second major goals, which are at least somewhat contradictory, that has guided development of the decomposition procedures described herein.

For example, it is known that most of the visual information in an image is captured in its luminance function. An images luminance function can be thought of as a function that, given an x, y location of the image it represents, returns the value representative of the image's brightness at that point. In contrast, relatively little of an image's information is contained in its colorization. Further, it is known that the human visual system is extremely sensitive to changes in the luminance of an image, even if the luminance change occurs over a very small area of an image, or over a short amount of time.

This importance of an image's luminance function has led to the creation of decomposition procedures that focus upon an image's luminance, rather than upon its colorization. It is also led to the above-describe design of decomposition procedures, where each frame of the decomposition video contains a set of pixels that is disjoint from the pixels selected for inclusion in any other frame. Entirely removing certain pixels from a frame is an effective and efficient way to obscure the luminance function of the original input image. Further, if one were to include part of a pixel's luminance in one frame of the decomposition video, and the rest of the same pixel's luminance in another frame of the decomposition video, there is a good likelihood that the human visual system could detect this as a change in luminance over time, rather than as a static net luminance. A desire to minimize the possibility for perception of luminance changes also led to the technique keeping a pixel completely off, during those frames of the decomposition video where it is not being used.

3 Spatial Frequency Filtering

3.1 Overview

As introduced above, the present invention focuses upon a two-tiered approach to obscuration of the input image's content—a first filter designed to obscure information present in the higher frequency spatial frequencies, and a second filter designed to obscure information conveyed by the lower frequency spatial frequencies.

This section presents various embodiments, and classes of embodiment, according to which both types of filtering can be accomplished. It is worth emphasizing, however, that depending upon the application and image content, it can be appropriate to use fewer (i.e., just one) or more (i.e., three or more) tiers of filtering.

Regardless of the number of tiers of filtering utilized, the implementation of a level of spatial frequency filtering can be described in terms of dividing the area of the input image, that can be referred to herein as "area_ii," into a suitable number of subregions (where the number of subregions can be referred to herein as "num_sr"). In general, for a particular level of spatial frequency filtering, all the subregions, into which area_ii is divided, share the following two characteristics:

they are of a same (or approximately same) area;
they are non-overlapping (or, at least, substantially non-overlapping);

Each of these subregions, into which an area_ii is divided, can be referred to as an "sr." For a division of area_ii to achieve higher-frequency spatial filtering, each such subregion can be referred to as an "srh," and an srh's area referred to as "area_srh." Similarly, for a division of area_ii to achieve lower-frequency spatial filtering, each such subregion can be referred to as an "srl," and an srl's area can be referred to as "area_srl."

Subregions of type srl are substantially larger than those of type srh. In fact, it has generally been found most effective for each srh subregion to have an area that is two or three orders of magnitude smaller than the area of each srl subregion. While substantially larger than subregions of type srh, it has generally been found most effective for each srl subregion to have an area that is two or three orders of magnitude smaller than area_ii. These relative size ranges can be summarized as follows:

$$(\text{area\_}ii \times 10^{-3}) \leq \text{area\_}srl \leq (\text{area\_}ii \times 10^{-2})$$

$$(\text{area\_}srl \times 10^{-3}) \leq \text{area\_}srh \leq (\text{area\_}srl \times 10^{-2})$$

By transitivity, area_srh can be summarized as follows, relative to area_ii:

$$(area\_ii \times 10^{-4}) \leq area\_srh \leq (area\_ii \times 10^{-6})$$

Regarding the upper and lower bounds listed, for each of the above-three ranges, they should be understood as approximate upper and lower bounds. Thus, the above three ranges can be re-summarized as follows:

approximately $(area\_ii \times 10^{-3}) \leq area\_srl \leq$ approximately $(area\_ii \times 10^{-2})$ approximately $(area\_srl \times 10^{-3}) \leq area\_srh \leq$ approximately $(area\_srl \times 10^{-2})$ approximately $(area\_ii \times 10^{-4}) \leq area\_srh \leq$ approximately $(area\_ii \times 10^{-6})$ While quite different in area, a rectangular shape (including, of course, a square) has been found effective for both types of subregions: srh and srl. While rectangular shapes are effective, many other types of polygonal shapes are also expected to be suitable, so long as the polygon selected, when it is repeated in order to fill area_ii, fits together into a regular and repetitive pattern.

In addition to specifying srh and srl relative to the area of the input image, once the number of pixels in the input image (referred to herein as the "resolution") is also known, the areas of srh and srl can be specified in terms of pixels. Depending upon the number of frames in the decomposition video, and the resolution of the input image, it may be desirable to define the areas of type srh and srl in terms of a smallest unit that includes more than one pixel. To encompass the possibility of the srh and srl subregions being defined in terms of a smallest unit that includes more than one pixel, the unit "virtual pixel" or "vixel" is also used herein. A vixel can be made of just one pixel, or it can contain two or more pixels, so long as the pixels form a continuous region.

The particular example image focused upon herein has the following dimensions in pixels: 640 (along "x" direction)×1136 (along "y" direction), for a total of 727,040 pixels per input image. As an approximate shorthand, the resolution of this type of image can be referred to herein as being approximately 0.7 megapixels. This image size is focused upon herein because it is, at least currently, a popular size among smart phone screens. This resolution is low enough, and srh's are small enough, such that it is usually sufficient to describe the possible sizes for an srh type subregion in terms of pixels (without resort to "vixel" terminology).

However, another popular screen resolution, currently found more commonly in larger devices (such as laptop computers), has a resolution of approximately 2.0 megapixels (e.g., about 2000 pixels along x direction, and about 1000 pixels along y direction). For images in this resolution range, it may be appropriate to define each srh type region as a vixel. For example, it may be appropriate to define each vixel as a square shape, formed from 4 pixels.

A more detailed discussion, of each type of subregion, follows.

3.2 Higher-Frequency Spatial Filtering

Figure 2A:
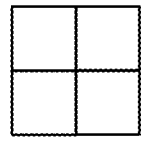
FIGS. 2A-2F each depict an example collection of vixels, from which an srh type subregion can be formed.
Figure 2B:
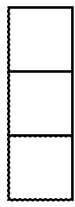
Figure 2C:
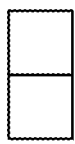
Figure 2D:
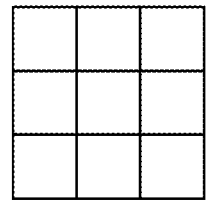
Figure 2E:
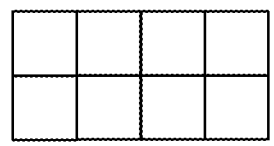
Figure 2F:
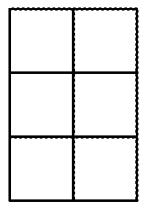

Example regions, of type srh, are shown in FIGS. 2A-2F. It should be understood that each of the units shown, in each of these figures, is intended to represent a vixel. Thus, for example, FIG. 2A depicts an srh formed from two vixels. Each of FIGS. 2B-2F depicts an srh formed from an incrementally larger number of vixels, starting at three for FIG. 2B, and ending at nine for FIG. 2F.

Within the size range of two to nine vixels, as represented by FIGS. 2A-2F, it can be seen that the following vixel sizes were not included: 5 and 7. This omission should not be understood to mean that, depending upon the application, srh's formed from 5 or 7 vixels cannot be useful.

FIGS. 2A-2F just represent an example selection of srh's sizes where it was chosen to keep each srh as either a square region, or as a rectangle with an aspect ratio not larger than 3.0 (where the aspect ratio is defined herein as the longer side divided by the smaller side).

As was discussed above, depending upon the resolution of the input image, it may be appropriate to define each vixel as consisting of two or more pixels. As was discussed above, as an example, for a display with a resolution of approximately 2.0 megapixels, it may be appropriate to define each vixel as being a square shape that is made of four pixels.

For purposes of understanding vixels, it can be useful to temporarily reinterpret FIGS. 2A-2F, as each representing a configuration of pixels by which a single vixel can be formed. Thus, for example, the four-pixel vixel discussed above can be represented by FIG. 2C, where each unit of FIG. 2C is understood to represent a pixel (rather than a vixel). However, other than the short digression of the present paragraph, for purposes of better understanding the formation of a vixel from pixels, each of FIGS. 2A-2F should be understood as presenting a configuration of vixels, in order to form an srh type region.

While an srh type region can be formed from more than nine vixels, FIGS. 2A-2F stop at this relatively small vixel-count, because the maximum number of frames possible for a decomposition video (i.e., the value of dv_max), can be expected to be relatively small (e.g., as discussed above, in the range of about 30). As will be made clear shortly, in the discussion below, the vixel count of an srh type region equals the number of frames it causes to be produced, in the decomposition video.

Therefore, if one chooses to stay with srh type regions that are square-shaped (or are close to square-shaped) there are only two more vixel configurations possible, before the 30 frame limit is exceeded:

One could use a 4 vixel by 4 vixel srh type region, that implies 16 frames in the decomposition video.
One could use a 5 vixel by 5 vixel srh type region, that implies 25 frames in the decomposition video.

It is important to note that the above-listed numbers of frames implied, based on srh vixel size, does not include an allocation of decomposition video frames for lower-frequency spatial frequency filtering.

The basis for the connection, between the vixel-count for an srh type region and the number of decomposition video frames it requires, is as follows: for each frame of the decomposition video, a different vixel, from each srh, is chosen for display. Typically, the vixel for each frame is selected in a random or pseudorandom fashion. The selection of only a single vixel for display, for each srh of the input image, tends to act as a kind of low-pass (or at least lower-pass) spatial frequency filter. In other words, the selection of only a single vixel, from each of the srh regions the input image is divided into, tends to obscure, for each frame of the decomposition video, the perception of high-frequency spatial frequencies present in the input image, while still permitting the perception of lower-frequency spatial frequencies.

A random or pseudorandom selection approach is favored for two primary reasons. First, it tends to prevent the perception of patterns, in the decomposition video as viewed by the human visual system. Second, without knowledge of the input image content, it is not known which selections of pixels offer the best obscuration. Blocking pixels on a random (or pseudorandom) basis is likely to provide, across wide varieties of content, the most consistent level of filtering.

It is worth noting that the simultaneous selection of two vixels, from each srh type subregion, is equivalent to selecting one vixel from each of two smaller srh type subregions. Similar logic can be applied to the simultaneous selection of three vixels from each srh type subregion—it is equivalent to selecting one vixel from each of three smaller srh type subregions. Thus, by induction, it can be seen that the simultaneous selection of any desired size of subset can be accomplished by repeated application of one-vixel selection, to multiple smaller srh subregions.

In order to better understand how the use of srh regions lead to the production of decomposition video frames, FIG. 3A depicts how an srh type region can be arranged as a matrix, across an input image. FIG. 3A depicts a matrix of srh's labeled 300. FIG. 3A includes a pair of axes 310. As can be seen, along the x dimension, matrix 300 has 18 srh's, while along the y dimension there are 34 srh's. A single example srh 301 is shown in more detail, and is representative of all the srh's of matrix 300. As can be seen, the srh chosen for matrix 300 is the same as that shown in FIG. 2F. For ease of reference, in the below discussion, each vixel of srh 301 is labeled 1-9.

FIG. 3B shows a matrix 320 that is the same as matrix 300 of FIG. 3A, except that alternating columns, of srh-type regions, are shifted relative to each other. This type of alternated shifting can aid in the effectiveness of blocking the perception of high-frequency spatial frequencies. Equivalently, alternating rows can be shifted.

FIG. 4 depicts in much greater detail, how one small portion of FIG. 3A can operate, with respect to utilization of its srh type regions. In particular, FIG. 4 depicts a square region labeled 401 (see upper left corner of FIG. 4) that we can refer to as a "sub-input image." As can be seen, sub-input image 401 consists of 16 srh regions, arranged as a 4×4 array. To aid in the identification of each srh region, one of the 16 srh regions has been labeled 410 (this is the srh at the upper left corner of sub-input image 401). As with FIG. 3A, each srh region, of sub-input image 401, consists of 9 vixels. In referring to the vixel's, of each of sub-input image 401's srh's, the same labeling of srh 301 is utilized.

For each of the 16 srh's of sub-input image 401, only the upper-left vixel (vixel 1 of 301) has been selected for display. This is indicated by the 16 vixels with light grey shading. The lower left corner of FIG. 4 contains a legend 411, in which it is shown that a pixel shaded light grey indicates selection of that pixel from the input image. Legend 411 also shows that all the remaining pixels of 401, shaded white, are actually not displayed (preferably displayed black).

In addition to sub-input image 401, FIG. 4 shows 8 other views of the same sub-input image, labeled 402-409. Each of 402-409 is intended to represent a same sub-input image, but at a different time. Sub-input images 401-409 are connected by directional arrows, to indicate an order by which they can be used as a nine-frame decomposition video.

As can be seen, each of 401-409 selects a different vixel, of the sub-input image's srh's. Using the labeling of srh 301, a vixel is selected, respectively, for each of 401-409, according to the following pseudo-random sequence: 1, 8, 6, 3, 4, 9, 2, 7, and 5.

When interpreted as a decomposition video, each of 401-409 can be interpreted in two different ways:

Each can be regarded as subset of 16 vixels, that has been selected from the complete sub-input image of 144 vixels. For each of the 9 subsets chosen, its vixels are disjoint from the vixels in any of the other 8 subsets. Across the 9 subsets (of 16 vixels each), all 144 vixels are chosen.

Each can be regarded as a mask, that is the same size as the sub-input image to which is to be applied. For each of masks for 401-409, the presence of a shaded square indicates that the corresponding vixel in the input image should be displayed. Conversely, a white square, in any of masks for 401-409, indicates that the corresponding vixel in the input image should not be displayed.

It should be noted that while the example of FIG. 4 depicts each frame of the decomposition video selecting for a same vixel, on an srh-by-srh basis, this need not be the case. For example, with regard to frame 401, rather than selecting vixel number 1, across all of its 16 srh's, a vixel can be selected for each srh on a random or pseudorandom basis. This kind of strategy, can be applied across all nine frames 401-409, with the only common constraint being that each frame selects a vixel subset that is disjoint from the subsets selected for any of the other eight frames.

3.3 Lower-Frequency Spatial Filtering

Figure 5:
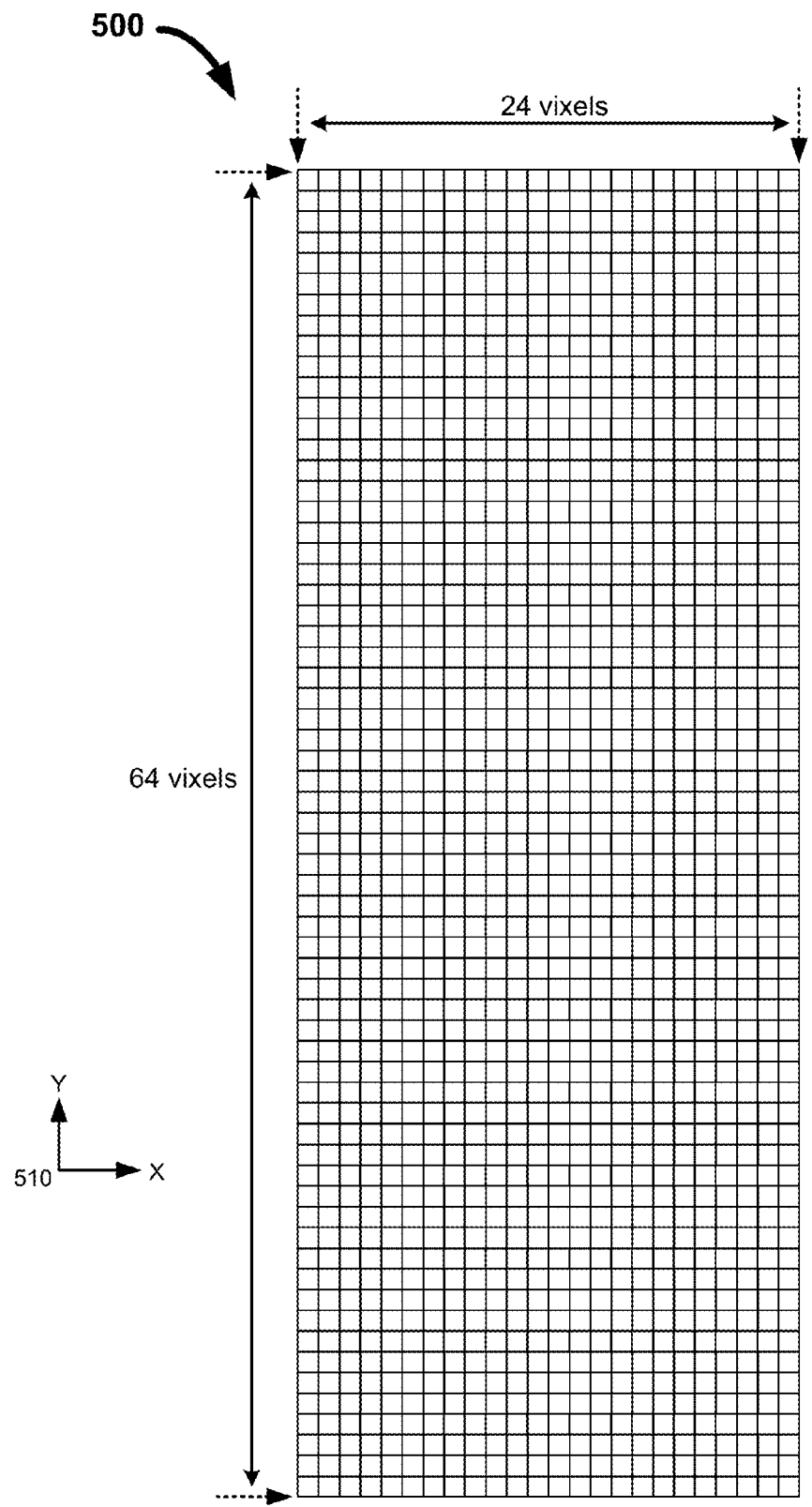
FIG. 5 depicts an example srl type area, designed to filter lower-frequency spatial frequencies.

FIG. 5 depicts an example srl type area, designed to filter lower-frequency spatial frequencies. For reference purposes, a pair of x, y axes 510 is included. The srl area of FIG. 5 is a matrix 500, that consists of 24 vixels along the x dimension, and 64 vixels along the y dimension. Matrix 500 contains a total of 1536 vixels (i.e., 24×64).

With respect to the 3 vixel by 3 vixel srh's discussed above, for FIGS. 3A-3B, and FIG. 4, it can be seen that a 9 pixel srh fits within the range presented above, with respect to a 1536 vixel srl:

$$\text{approximately } (\text{area\_}srl \times 10^{-3}) \leq \text{area\_}srh \leq \text{approximately } (\text{area\_}srl \times 10^{-2})$$

This range, for a 1536 vixel srl, translates into the following:

$$\text{approximately } (1.536 \text{ vixels}) \leq \text{area\_}srh \leq \text{approximately } (15.36 \text{ vixels})$$

Since fractional vixels are not an option, the just-above listed range can be further approximated as follows:

$$2 \text{ vixels} \leq \text{area\_}srh \leq 16 \text{ vixels}$$

Thus, for the example srl type region of FIG. 5, a suitably-sized srh can be anywhere from 2 vixels (e.g., a 1 vixel by 2 vixel rectangle) to 16 vixels (e.g., a 4 vixel by 4 vixel square).

FIGS. 6A and 6B depict matrices 600 and 620 that are essentially identical to, respectively, matrices 300 and 320 of FIGS. 3A and 3B. The only difference is that matrices 600 and 620 represent placements of srl type regions, that are, of course, approximately two to three orders of magnitude larger than an srh type region. Specifically, FIG. 6A shows vixel matrix 500, and how it can be repeated across an input image. In particular, FIG. 6A includes axes 610, by which it can be seen that matrix 600 has 18 srl type regions along the x dimension, and 11 srl type regions along the y dimension.

FIG. 6B depicts the fact that the lower-frequency blocking of srl type regions can be enhanced by shifting alternating columns of matrix 600, in order to produce matrix 620. Of course, equivalently, alternating rows can be shifted.

While it is generally beneficial to specify matrix 300 (of srh's) and matrix 600 (of srl's) in terms of a common matrix at the vixel-by-vixel level, there is absolutely no need for any kind of synchronization, between the placement of srh's and srl's. In other words, boundaries of srh's do not need to have any particular relationship to boundaries of srl's. Of course, for particular applications, it may be found to be desirable to have some kind of synchronization between the placement of srh and srl type regions.

Figure 7:
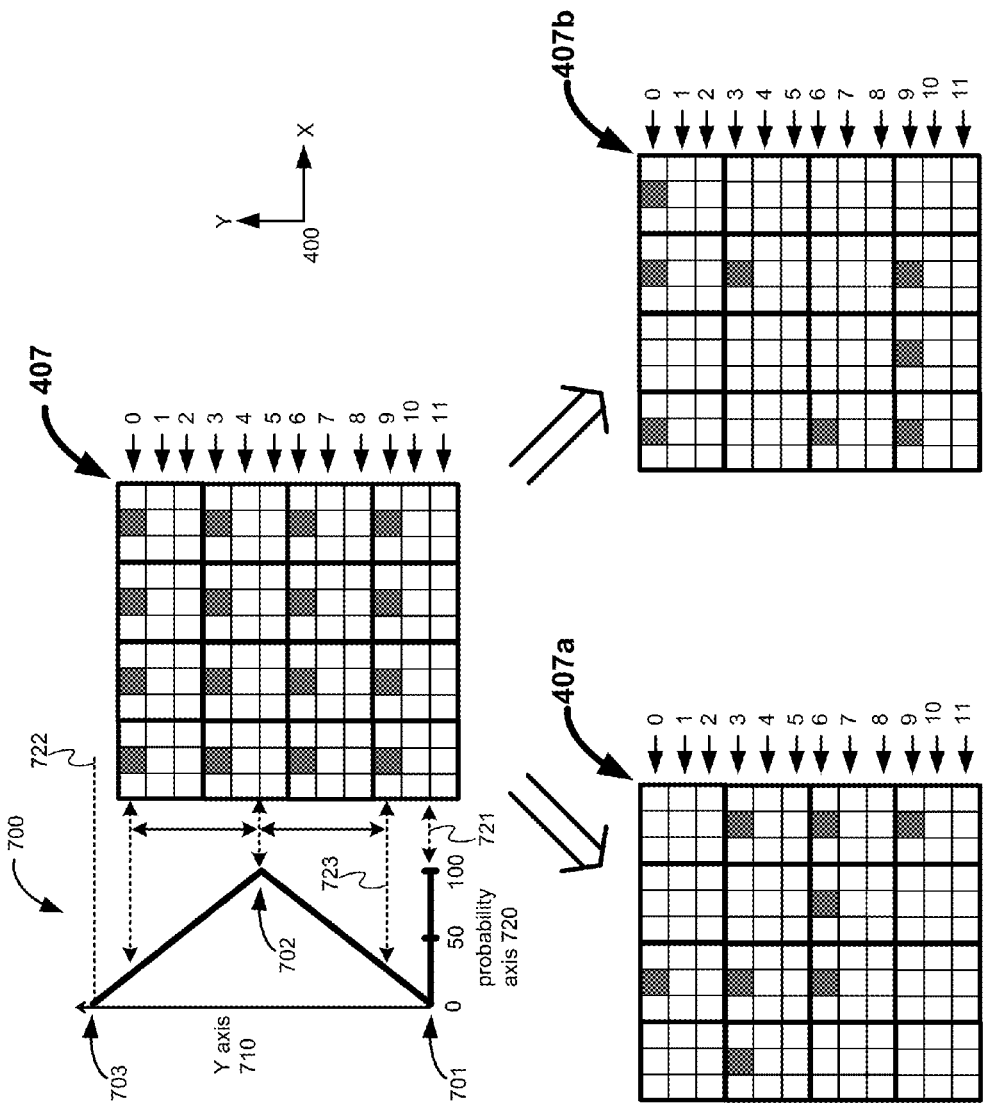
FIG. 7 is intended to illustrate vixel-by-vixel interaction, between an srl and the srh's with which there is overlap.

In terms of vixel-by-vixel interaction, between an srl and the srh's with which there is overlap, FIG. 7 is intended to illustrate this at a detailed level. In particular, FIG. 7 duplicates decomposition video frame 407 of FIG. 4. Further, FIG. 7 introduces a function 700, that depicts how an srl type region can interact with srh type regions.

Function 700 comprises two axes:
Y axis 710; and
Probability axis 720.

Y axis 710 of function 700 is intended to represent length, along one dimension of an srl type region. For purposes of this example, Y axis 710 has a length of 12 vixels. The probability axis 720 is intended to represent, along the other dimension of an srl type region, the application of a probability value. Probability axis 720 is shown in terms of percentages, and ranges from a lowest probability of 0% to a maximum probability of 100%. For the particular example function 700, probability is shown as varying according to a "saw tooth" function, along the Y axis. Specifically, at lowest point 701 on the Y axis, the probability is 0%. Proceeding upwards along the Y axis 710, the probability level then increases, according to a constant slope, until a probability of 100% is reached at point 702. Proceeding further upwards along the Y axis, from point 702, the probability level then decreases, according to a constant slope, until a probability of 0% is once again reached at point 703.

For purposes of understanding how each srl region interacts with the srh regions, function 700 can be regarded, for all practical purposes, as being the srl region itself. The range, over which function 700 is applicable, along both the X and Y axis of an input image, is the effective size of each srl region. For function 700, the extent of its effect along the Y axis is equal to the length of its Y axis 710. While not explicitly shown in FIG. 7, the extent of the effect of function 700, along the X axis, is chosen to be 12 vixels.

To illustrate how function 700 can be applied to srh type regions, two subframes of decomposition video frame 407 are also shown in FIG. 7, one labeled 407a and the other 407b. Function 700 as shown in FIG. 7, when applied to frame 407, directly produces subframe 407a.

To further emphasize the fact that srl subregions need not be aligned with srh type subregions, function 700 is not aligned with the srh type regions of 407. In FIG. 7, the rows of frame 407 are numbered along the Y axis, from top to bottom, 0 through 11. As can be seen from double-headed dashed arrow 721, Y axis 710 is aligned such that it begins with row 10 of frame 407, whereas the lowest row of srh type regions occupy rows 9 through 11. Furthermore, dashed line 722 shows that the top end of Y axis 710 ends above the top row of srh type regions of frame 407 (the top row of srh type regions occupy rows 0-2).

The detailed interaction between function 700 and the srh type regions will now be explained, starting with row 10, and proceeding upwards. Row 10 is aligned with, approximately, probability value 0% of function 700. This probability value of 0% is applied, as follows, to each vixel of row 10: if a vixel of row 10 had previously been marked for display, as part of the decomposition video that included frame 407, then the vixel is deleted from the subset of vixels to be represented by subframe 407a. A vixel of row 10 would have been previously marked for display as a result of the application of srh type regions, for purposes of higher-frequency spatial frequency filtering. All vixels previously marked for display are deleted because the 0% of function 700 is interpreted to mean that any pixel marked for display, in the row to which it aligns, is to be given 0% chance of being included resulting subframe 407a.

Row 9 is now considered. As indicated by double-headed dashed arrow 723, row 9 is aligned with a probability of approximately 25%. Further, row 9 includes 4 vixels marked for inclusion in the vixel subset represented by frame 407. Each of these 4 vixels is considered separately with respect to function 700, and therefore each of them, on its own, has a 25% chance of being included in subframe 407a. Row 9 of subframe 407a is shown as depicting one likely outcome of this process, wherein only one of the 4 vixels in row 9 of frame 407 is included in row 9 of subframe 407a.

Continuing upwards, through frame 407, rows 8 and 7 are now considered. Each vixel of row 8 is considered with the probability that is substantially higher than the probability applied for row 9. For example, the probability of 40% might be applicable to row 8. However, since no vixels of row 8 are marked for inclusion in frame 407, none of them can be included in subframe 407a. Similarly, row 7 will have a probability substantially higher than that for row 8. For example, the probability of 60% might be applicable to row 7. Once again, however, since no vixels of row 7 are marked for inclusion in frame 407, none of them can be included in subframe 407a.

At row 6, the applicable probability is assumed to be 75%. As with row 9, discussed above, row 6 also includes 4 vixels marked for inclusion in the vixel subset represented by frame 407. Each of these 4 vixels is considered separately with respect to function 700, and therefore each of them, on its own, has a 75% chance of being included in subframe 407a. Row 6 of subframe 407a is shown as depicting one likely outcome of this process, wherein 3 of the 4 vixels, in row 6 of frame 407, are included in row 6 of subframe 407a.

Each vixel of row 5 is considered with the probability that is substantially higher than the probability applied for row 6. For example, the probability of 90% might be applicable to row 5. However, since no vixels of row 5 are marked for inclusion in frame 407, none of them can be included in subframe 407a.

Between row 5 and row 4, the apex of function 700 is reached (the point where, if function 700 were applied, the applicable probability would be 100%).

Rows 4 through 0 are then the mirror image of rows 5 through 9, as discussed above:
Row 4: operates the same as described above for row 5.
Row 3: operates the same as described above for row 6.
Row 2: operates the same as described above for row 7.
Row 1: operates the same as described above for row 8.
Row 0: operates the same as described above for row 9.

Subframe 407b can be produced by applying a function 730 to frame 407 in exactly the same way described above for application of function 700 to frame 407, except that function 730 (not illustrated) is the exact inverse of function 700. In this case, because the inverse function is exactly symmetric about the 50% probability line, the equivalent of applying an inverse function 730 can be achieved simply by making subframe 407b reflect opposite choices, regarding inclusion of a vixel, to those choices that resulted in the formation of subframe 407a. For example, comparing row 0 of subframe 407a to row 0 of subframe 407b, we can see the following:

Every time a vixel, part of the subset of frame 407, was included in subframe 407a, that vixel is not included in the subset represented by subframe 407b.

Every time a vixel, part of the subset of frame 407, was not included in subframe 407a, that vixel is included in the subset represented by subframe 407b.

The net result, of application of function 700 to all 9 frames of FIG. 4 (i.e., application of function 700 to each of frames 401-402) is to produce a total of 9 pairs of subframes. These 18 subframes are then the decomposition video, reflective of both higher-frequency and lower-frequency spatial filtering.

Experimentally, it has been found that the above-described second major goal (for a decomposition video) is better satisfied if each pair of frames, in the temporal dimension, immediately adjacent to each other. For example, with respect to subframes 407a and 407b of FIG. 7, it is generally best to play subframe 407b immediately after subframe 407a (or, equivalently, one can play subframe 407a immediately after subframe 407b).

Experimentally, it has also been found that the above-described second major goal (for a decomposition video) is better satisfied if, in fact, each pair of subframes is played within a time period equal to approximately $$\frac{1}{30}$$

sec., or less.

Function 700 represents an srl type region that is unrealistically small, when compared with the size of the srh type subregions shown in FIG. 7. Specifically, function 700 represents an srl type region with an area of 144 vixels (function 700 effects an area with dimensions of 12 vixels by 12 vixels), while the srh subregions shown have an area of 9 vixels. This unrealistically small size for the srh subregion was chosen so that the interaction of an srl, with the srh's it overlaps, can be shown in great detail.

Figure 8:
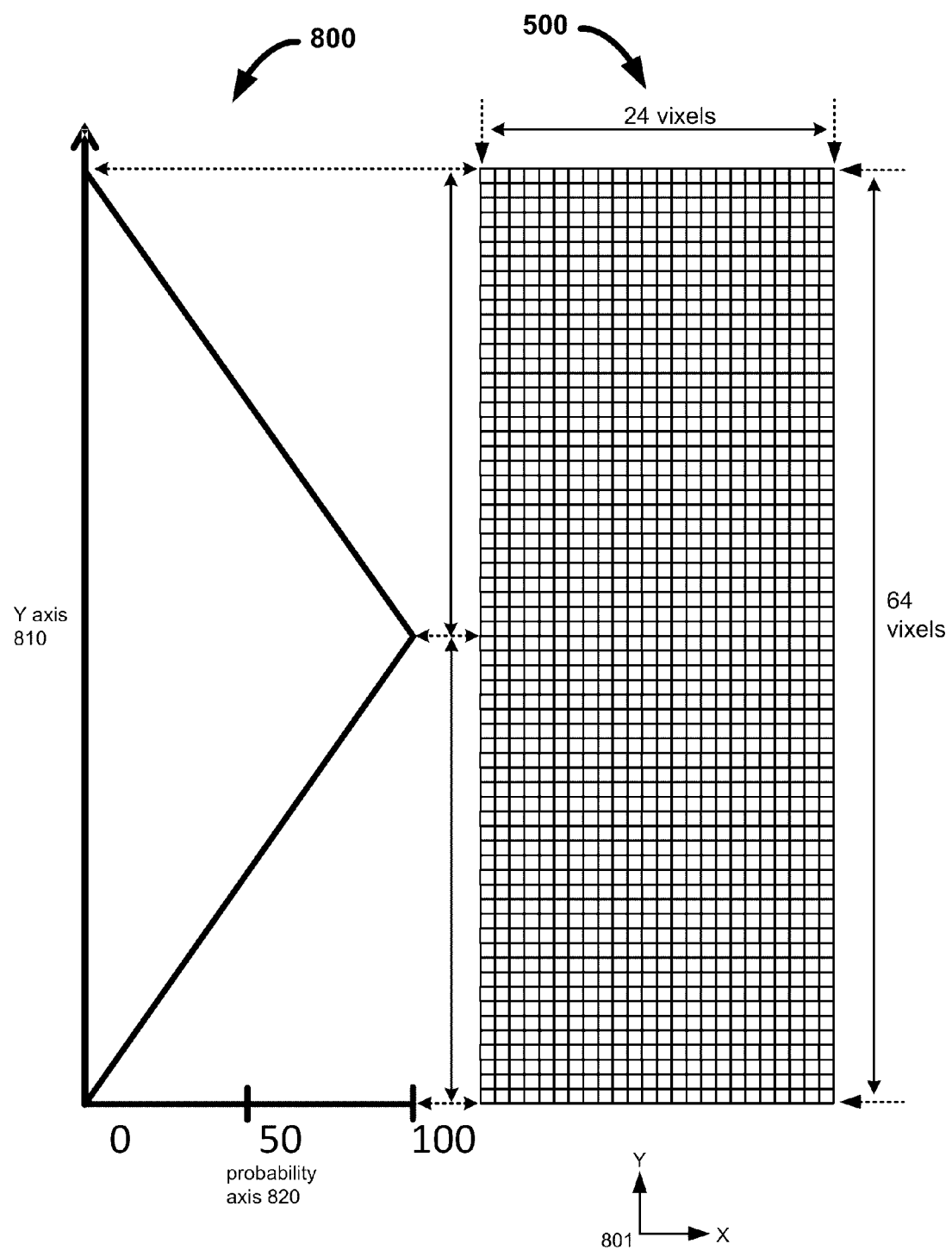
FIG. 8 depicts a matrix consisting of 1136 vixels, with respect to application of an srl function 800.

FIG. 5 already introduced a realistically-sized srl (for use with, for example, srh's of 9 vixels): a matrix 500, consisting of 1136 vixels. FIG. 8 depicts the same matrix 500, but this time with respect to application of an srl function 800. Srl function 800 is the same as srl function 700, except that function 800 is designed to apply across a region of an input image that is 64 vixels along the Y dimension (i.e., see Y axis 810) and 24 vixels along the X dimension (as with function 700, the X dimension of function 800 is not explicitly shown). Other than the difference in spatial dimensions, probability axis 820 varies from 0% to 100%, just like probability axis 720. Also, function 800 represents a "saw tooth" function, that is symmetric about 50% probability.

Figure 9B:
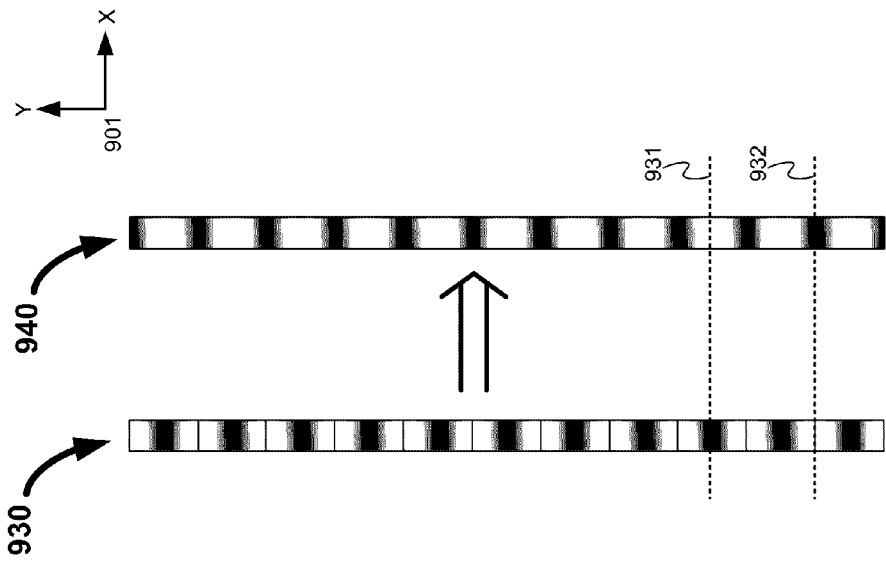
FIG. 9B repeats the column of srl type subregions of FIG. 9A, and also includes the column that would be produced, if the inverse function were applied.
Figure 9A:
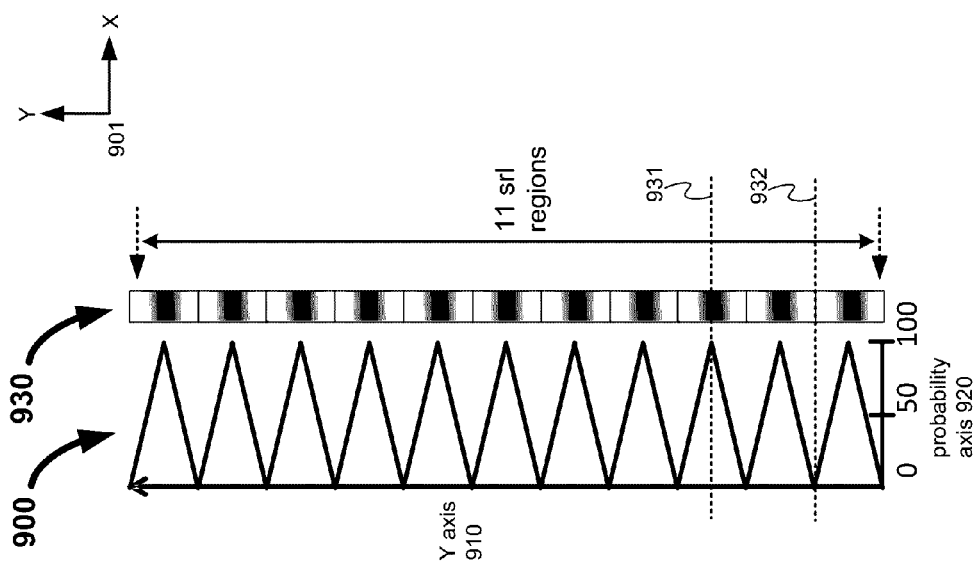
FIG. 9A shows 11 pairings, between an srl function and an example srl region, that are stacked on top of each other, in order to form two columns.

FIG. 9A has the same pairing shown in FIG. 8, between an srl function 800, and an example srl subregion (i.e., matrix 500) to which the srl function can be applied. However, FIG. 9A duplicates this pairing 11 times, in order to form two columns:

A column 900, that consists of 11 srl functions 800 stacked on top of each other. The alignment of the 11 srl functions is reflected in their sharing common Y axis 910.

A column 930, that consists of 11 srl subregions (of the same size as subregion 500 of FIG. 8), stacked on top of each other.

In addition, each of the srl subregions, of column 930, is provided with shading, that varies along the Y axis, as one proceeds from one end of an srl subregion to the other. The darker an area is shaded, the more likely it is that the area (with respect to the input image) will have its pixels displayed as part of a particular frame of a decomposition video. As one would expect, along the Y axis, each srl type subregion is darker towards the center, since that is where its corresponding probability function is at its greatest value. For example, see dashed horizontal line 931, that passes through the apex of the third sawtooth function from the bottom of Y axis 910. With respect to this sawtooth's corresponding srl subregion, it can be seen that horizontal line 931 passes through the area of darkest shading.

Conversely, whiter areas are less likely to have their pixels displayed, as part of the particular decomposition video frame. For example, see dashed horizontal line 932, that, with respect to the first sawtooth function at the bottom of Y axis 910, passes through its upper minimum. It can be seen that horizontal line 932 passes through an area that is essentially white.

Because the srl function applied does not vary along the X axis, neither does the shading. It can be seen that, for each srl, along any chosen horizontal line, the level of shading remains essentially constant. For example, the shading through which horizontal line 931 passes is an essentially constant level of black. Conversely, the area through which horizontal line 932 passes is essentially a constant level of white.

Because the same srl function is being applied to each srl subregion of column 930, the pattern of shading for each srl is the same, as one proceeds along the Y axis, from one end of an srl subregion to its other end.

If the srl function is applied as an addition to an srh-based selection function, then each srl subregion of column 930 is essentially the same as subframe 407a (discussed above with respect to FIG. 7). In FIG. 9A, each srl subregion appears to be "shaded," simply because the number of vixels shown in FIG. 9A is so much greater then was addressed in FIG. 7, and the vixels of FIG. 9 are shown at a much smaller scale.

FIG. 9B repeats column 930 of FIG. 9A, but depicts an additional column 940. Columns 930 and 940 are aligned exactly, with respect to the Y axis. Column 940 is the same as column 930, except that column 940 represents the result of applying an srl function that is the exact inverse, of the function represented by column 900 of FIG. 9A. Just as column 930 is essentially the same as subframe 407a, column 940 is essentially the same as subframe 407b, since both can be produced by applying an inverse function. Also, just like subframe 407b, an alternative method for producing column 940 is (for each vixel determined to be a candidate for inclusion in a decomposition video frame) to simply make the opposite decision for each vixel of column 940, in comparison to the decision made for the corresponding vixel of column 930.

In order to make the comparison between columns 930 and 940 easier, horizontal dashed lines 931 and 932 are repeated in FIG. 9B. In FIG. 9B, these lines are extended such that they pass through the corresponding region of column 940. As can be seen, with respect to column 930, each of these lines passes through in inverse region in column 940.

FIG. 9C shows an example of how each of columns 930 and 940 can be repeated, in order to perform lower-frequency spatial frequency filtering across an entire input image. Region 950 is comprised of 8 columns, each being the same as column 930. In addition to repeating column 930, the technique of shifting alternating columns is also used. Similarly, region 951 is comprised of 8 columns, each being the same as column 940. In addition to repeating column 940, the technique of shifting alternating columns is also used. In order to preserve the comparison, between columns 930 and 940, horizontal dashed lines 931 and 932 are repeated in FIG. 9C.

As can be seen in FIG. 9C, the amount of Y axis shifting, between any two consecutive columns, is an amount that is approximately one-half the Y axis length of each individual srl subregion. This can be readily observed by considering horizontal line 931. With respect to column 930, line 931 passes through an srl type subregion along its line of maximum probability. With respect to the column immediately to the right of column 930, labeled column 935, it can be seen that line 931 passes through an srl type region along its line of minimum probability. This type of one-half-Y-axis-srl-length shifting can also be referred to as 50% alternating-row shifting. While approximately 50% alternating-row shifting is shown in the examples, any suitable shifting percentage can be utilized, depending upon the application.

If the technique of FIG. 9C is used in conjunction with an srh-level selection function, then regions 950 and 951 can be viewed as a pair of additional masks, that would be used in addition to each mask based on the srh-level selection function. For example, FIG. 4 showed how a 9-way selectable srh-level selection function was first used to produce 9 masks (labeled 401-409). With each of these srh-level masks, srl-level masks 950 and 951 would also be used, to produce 9 pairs of frames (total of 18 frames) for the decomposition video.

If the technique of FIG. 9C is not used in conjunction with an srh-level selection function, then regions 950 and 951 can be viewed as the only two masks applied to the input image, in order to produce a two-frame decomposition video. This kind of use of lower-frequency spatial frequency filtering, without higher-frequency spatial frequency filtering, can be appropriate for some applications. Conversely, as was discussed above for higher-frequency spatial frequency filtering, for some applications, it may be appropriate to only use an srh-level selection function for the production of the decomposition video.

It is important to note that while the examples of srl-level selection functions have focused upon sawtooth waveforms, any other type of waveform can be used, depending on the particular application.

For example, a sinusoidal shaped selection function can be used. As another possibility, a square wave shaped selection function can be used. If the square wave selection function only varies between probabilities of 0% and 100%, then the "probability" function reduces to a standard square wave, being utilized as the selection function.

While square waves can be utilized, it has been determined experimentally that, in general, srl-level selection functions with some amount of slope, connecting their minimum and maximum probabilities, tends to result in a decomposition video that better satisfies the second major goal (a smoothly playing video, that appears to be a single static image). This is due to the fact that, during transitions from one srl-level phase to another, edges between srl-level subregions are softened, attracting less attention from the human visual system.

Furthermore, the srl-level examples focused upon herein show a selection function that has only two phases. In particular, the examples have focused upon the use of two sawtooth waves, 180 degrees out of phase with each other.

However, for any of the possible waveform types, more phases can be utilized, as appropriate for the application. For example, three sinusoidally-shaped srl-level selection functions can be utilized, where each sinusoid varies between a minimum probability of 0% and a maximum probability of 66%. As with the example sawtooth waveforms, a complete cycle of each sinewave can have a length, along the Y axis, equal to the Y axis length of each srl type subregion. If the three sinusoids are shifted by 120 degrees, with respect to each other, then, at each location of the input image, the probabilities of the three phases will add to 100%.

In general, the use of more srl-level phases assists with achieving both the first and second major goals, for decomposition videos. With regard to better achieving the first major goal, having more phases means that each frame of the decomposition video, if captured by a screenshot, will have less lower-frequency spatial frequency information. This can be seen from the fact that the use of more phases generally means that each of the srl-level selection functions reaches a lower maximum probability level. With regard to better achieving the second major goal, having more phases means that the frames of the decomposition more gradually combine, meaning that the possibilities for abrupt transitions or edges, that attract attention from the human visual system, are reduced.

However, with regard to the use of more srl-level phases, it has been determined experimentally that a frame rate of approximately 60 fps is generally desirable, for a two-phase srl-level selection function. Then, for each additional phase to be utilized, it is generally desirable if the frame rate available, for playing the decomposition video, increases by the following amount: approximately 30 fps or more. For example, if a three-phase srl-level selection function is desired, then it is generally desirable for the frame rate to be increased to the following amount: approximately 90 fps or more. With a four-phase srl-level selection function, it is generally desirable for the frame rate to be increased to the following amount: approximately 120 fps or more.

Also, while the srl-level selection functions presented herein have focused on functions that vary along only one dimension (e.g., along the Y dimension), depending upon the application, it can be appropriate to utilize two-dimensional srl-level selection functions. For example, with respect to srl function 800 of FIG. 8, in addition to a sawtooth pattern along the Y axis of srl type subregion 500, there can also be a similar sawtooth pattern along the X axis of subregion 500. The three-dimensional equivalent of a sawtooth pattern can be regarded as a four-sided pyramid. In this case, rather than maximum probability occurring along a line parallel to the X axis and passing through the midpoint of the srl region's Y axis dimension, maximum probability occurs at a point. This point of maximum probability is at the point within srl type subregion 500 that is mid-way between both its Y and X dimensions. From the point apex, the probability then slopes downwards, in four directions, along each side of the four-sided pyramidal shape.

4 Pseudo-Coded Implementation

FIGS. 10A-10C present an example pseudo-coded implementation, that utilizes both srh-level and srl-level of spatial frequency filtering. At the srh-level, a 9-way square-shaped selection function is used, of the kind discussed above with respect to, for example, FIGS. 4 and 7. At the srl-level a two-phase sawtooth-shaped selection function is used, of the kind discussed above with respect to, for example, FIG. 9 (i.e., its srl-level selection function 900).

A pseudo-coded procedure named "display_frame" is presented, that begins at line 3 of FIG. 10A, and ends at line 29 of FIG. 10C.

The pseudo-code is based loosely on the "C" programming language. As such, the pseudocode contains two main types of text:

Text that is to be interpreted as operational commands that would be executed by a computer, were the pseudocode to be recoded into an actual programming language.

Text that is to be understood as commentary, that helps to explain the operational commands. Text that is commentary is easily identified by the fact that, per standard C programming language syntax, a comment begins with the two-character sequence "/*," and ends with the two-character sequence "*/."

Since display_frame uses a 9-way srh-level selection function and a 2-way srl-level selection function, the total decomposition video to be played consists of 18 frames, organized as 9 pairs of complementary frames.

Each time display_frame is called (by an on shown higher-level procedure), display_frame displays one additional frame of the 18 frame sequence. As a way of distinguishing between the two frames comprising each frame-pair, the first frame of a pair is referred to as its "even" frame, and the second frame of the same pair is referred to as its "odd" frame.

The first time display_frame is called, it displays the odd frame of the first pair. On the second call, display_frame displays the even frame of the same first pair. Further calls to display_frame work in the same fashion, alternating between the display of even and odd frames. Some of the variables utilized by display_frame maintain their state, between calls to display_frame, such that display_frame can keep track of its location within the 18 frame sequence to be played.

The body of display_frame, from line 5 of FIG. 10A through line 23 of FIG. 10C, generates a suitable mask for application to the input image. Once this has been accomplished, line 27 of FIG. 100 makes a call to a procedure called "go_display_frame." go_display_frame then actually produces a frame, from the input image, that is a frame of the decomposition video. As discussed in the comments of lines 25-26, that are just above the call to go_display_frame, go_display_frame accomplishes this by performing an AND operation, on a vixel-by-vixel basis, between the mask just produced in the input image.

A line-by-line discussion of display_frame follows.

The portion of the pseudocode to be discussed just below is that of FIG. 10A. Therefore, unless specifically indicated otherwise, the line numbers mentioned in the discussion below should be understood to refer to lines of FIG. 10A.

display_frame first tests, at line 5, for whether this is the very first (or initial) time it is being called. This means that the global state, maintain between calls to display_frame, has been reset. If the Boolean variable "first_time" tests as having the value TRUE, then line 6 to line 10 are executed. In particular, line 8 sets all elements of matrix "display_even_frame" to the Boolean value FALSE. Line 10 sets all elements of matrix "mask" to being OPAQUE. As stated in the commentary of lines 6-7, the purpose of display_even_frame is to keep track of whether they vixel of the input image was displayed during the last time an even-numbered frame of the decomposition video was displayed.

Next, in order to perform srh-level spatial frequency filtering, a current vixel is selected by line 14, in accordance with a 9-way srh-level selection function. As can be seen, from the set of numbers at the right side of line 14, selection of a vixel at the srh-level is accomplished according to a pseudorandom sequence. Each selection is included as a pair, since each pair of decomposition video frames is to be identical at the srh-level of filtering (of course, each pair of frames is 180 degrees different, at the srl-level of filtering).

At line 17, a first "for loop" (or for-loop) is initiated, that steps through the vixels, of the mask to be produced, on a row-by-row basis along the Y axis. At line 19, a second "for loop" (or for-loop) is initiated, that is nested, with respect to the first for-loop. As such, for each row selected by the first (or Y axis) four-loop, the second four-loop successively identifies individual vixels, within the currently selected row, by iterating along the X axis.

Next, line 22 determines the location of the currently selected vixel, within its enclosing srl-type region. Since only a two dimensional srl-type function is being used (one dimension being Y axis position, and the other being probability), only the row position of the currently-selected vixel, with respect to its enclosing srl-type region, is relevant. This srl-relative row position is referred to as "virtual," and, hence, the variable containing its value is called "virtual_srl_row."

Since the two dimensional srl-type function being used is a sawtooth pattern, line 27 assigned a probability to the current virtual row, based on the value of virtual_srl_row, that varies linearly from 0.0 to 1.0, and linearly from 1.0 back to 0.0.

For purposes of determining whether a vixel, if selected at the srh-level, is to actually be included in the current frame, it is convenient to convert the probability of line 27 into a percentage-type probability. This is accomplished at line 32.

All lines of FIG. 10A now having been discussed above, for the discussion below, unless specifically indicated otherwise, the line numbers of the discussion below should be understood to refer to lines of FIG. 10B.

Lines 2 through 23 address the case where the current frame to be displayed is the even frame, of a frame pair. If the Boolean variable "even frame" tests as TRUE, then lines 4-21 are executed.

Within lines 4-21, lines 6-8 perform, as necessary, a "clean up" operation, from the production of the last frame. Line 6 tests whether the current vixel was displayed during the last frame (which is an odd frame). This is determined by the somewhat circuitous route of testing whether the current vixel was NOT displayed in the last even frame. Not being displayed in the last even frame (which is two frames earlier) means that, by implication, the vixel was displayed in the last immediately-preceding odd frame. If the current vixel was displayed in the last frame (which is, equivalently, the last odd frame), then the mask location, corresponding to that vixel is reset to OPAQUE (by line 7).

Next, at line 11, as kind of virtual "die" is "rolled," in order to produce a pseudo-random value within the range of 0 through 99. The variable "die" is set to this value.

At line 12 a test is performed, to see whether the value of "die" is less than the above-determined likelihood_to_accept. While the value of die is assigned at random (or, at least, at pseudo-random), it cannot be known for certain whether, for a particular die "roll," the value of the die will be less than likelihood_to_accept. However, it can be appreciate that the larger the value of likelihood_to_accept (a value that can vary from 0 through 100), the greater the probability that a roll of the die is less than likelihood_to_accept.

If the test of line 12 returns a value of TRUE, then lines 13 through 20 are executed. Within lines 13-20, the first operation to perform is to determine the location of the current vixel with respect to its enclosing srh-level region (this is a position that requires X and Y coordinates, but, since an srh-type region is generally quite small, it can easily be expressed by a single number). This determination of the current vixel's srh-relative location is accomplished by line 14, where it is stored in the variable "virtual_srh_position." Then, at line 18, the virtual srh position, of the current vixel (i.e., the vixel currently selected by the nested Y-dimension and X-dimension for-loops), is compared to the virtual srh position that has been selected for application to the entire current frame (that selection being stored in the variable srh_current_vixel).

If line 18 determines that the two values (i.e., virtual_srh_position and srh_current_vixel) are equal, then (see line 19) the mask is set to TRANSPARENT, with respect to the current vixel.

All lines of FIG. 10B now having been discussed above, for the discussion below, unless specifically indicated otherwise, the line numbers of the discussion below should be understood to refer to lines of FIG. 10C.

Lines 2 through 20 address the case where the current frame to be displayed is the odd frame, of a frame pair. This occurs if the Boolean variable "even frame" (discussed above with respect to FIG. 10B) tests as FALSE, which causes lines 4 through 18 to be executed.

The execution of lines 4-18 begins with a test, at line 4. This test is for whether, with respect to the first (and even) frame of the current frame-pair, the current vixel was displayed. If the current vixel was not displayed, then the current odd frame needs to make the opposite decision (in order that the odd frame reflect the complementary srl-level selection function), and so lines 6 through 11 are executed.

At line 6, the virtual position of the current vixel, with respect to its enclosing srh-type region, is determined (and stored in virtual_srh_position). Next, at line 10, a test is performed, to determine whether the virtual srh position, of the current vixel, is equal to the virtual srh position that has been selected for application to the entire current frame. If line 10 determines that the two values (i.e., virtual_srh_position and srh_current_vixel) are equal, then (see line 11) the mask is set to TRANSPARENT, with respect to the current vixel.

Returning to line 4, if this test determines that, with respect to the first (and even) frame of the current frame-pair, the current vixel was displayed, then this currently vixel should not be displayed as part of the odd frame. This is accomplished by executing line 17, that sets the mask location, corresponding to the current vixel, to the value OPAQUE.

At this point, the entire body of the procedure display_frame, as it exists within the nested for-loops, has been executed. This is the code that begins at line 22 of FIG. 10A, and that ends at line 20 of FIG. 10C. This block of code can be referred to herein as the "vixel-specific code block."

Once the vixel-specific code block has been executed, for all pixels of the input image, both nested four-loops, that end at lines 22 and 23, are completed. The only remaining step for display_frame is to actually display the just-determined frame. As has already been discussed above, this is accomplished by calling (at line 27) a procedure called go_display_frame. The entire display_frame procedure ends at line 29.

It should be emphasized that the above-discussed pseudo-code is just presented as simply one example implementation, that was constructed in accordance with the principles of the present invention.

5 Further Variations

With regard to decomposition procedures constructed in accordance with the above-discuss techniques, it is important to emphasize (or reemphasize) the variations that can be incorporated in any particular implementation, depending upon the particular application and/or the computing resources available.

For example, it can be desirable to implement a decomposition procedure using some degree of concurrent (or parallel) processing. An example of how this can be accomplished, with respect to the above-discussed Pseudo-Coded Implementation, is as follows.

With regard to the pseudo-coded implementation presented in FIGS. 10A through 10C, a block of code was identified that is executed repetitively for every vixel of an input image. This block of code, that begins at line 22 of FIG. 10A, and that ends at line 20 of FIG. 10C, is referred to as the vixel-specific code block. With regard to increasing the speed of a decomposition procedure, it is important to note that each execution of the vixel-specific code block can occur, essentially, independently of any other execution of the vixel-specific code block.

It would therefore be desirable to be able to reduce, to at least some extent, the number of iterations of the nested for-loops, within which the vixel-specific code block is executed. For example, if one has access to sufficient computing hardware, such that each execution of the vixel-specific code block can be accomplished on separate hardware, then the nested for-loops can be eliminated entirely. Instead, in the time it takes to execute the vixel-specific code block just one time, and entire decomposition video frame can be produced.

A particular kind of hardware that can be utilized to achieve at least some concurrent execution of the vixel-specific code block, is known as a Graphics Processing Unit (or GPU). GPU's are manufactured by such companies as NVIDIA (Santa Clara, Calif., USA).

6 Use Case Scenarios

The present section presents further elaborations, of use case scenarios for the present invention.

Figure 11A:
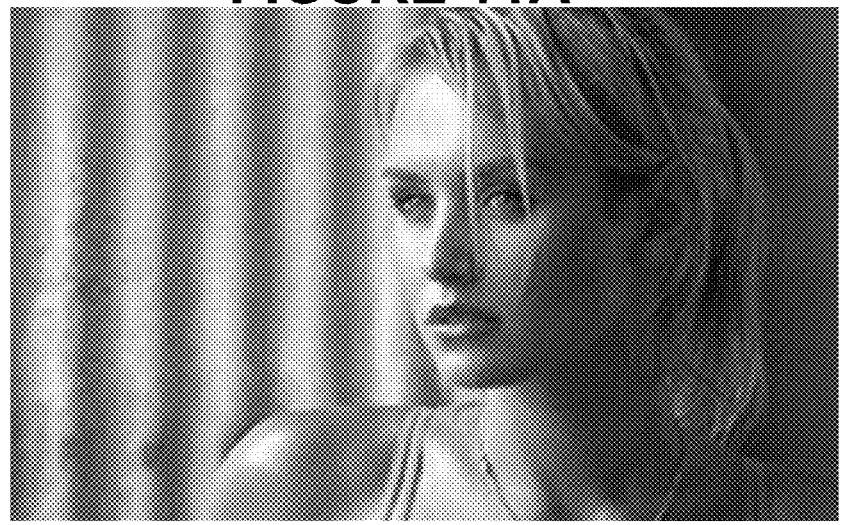
FIG. 11A re-presents the example input image of FIG. 1A.
Figure 11B:
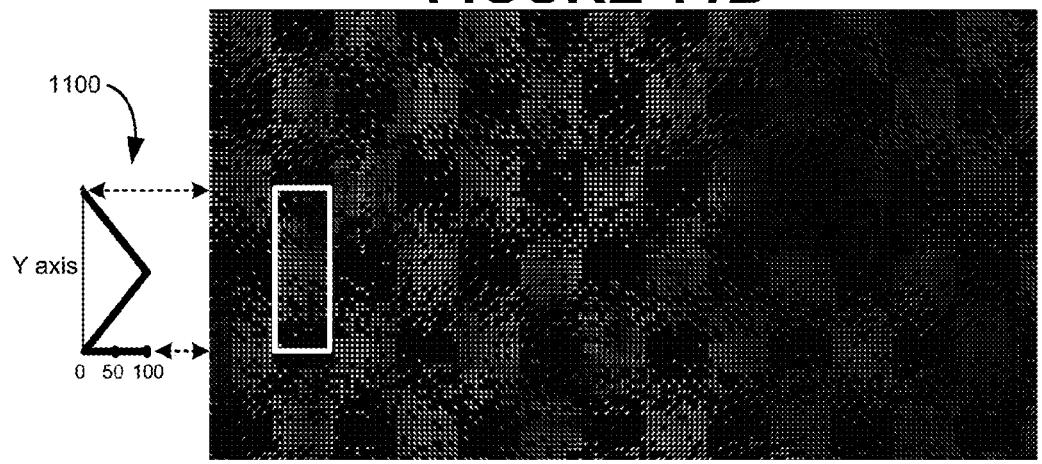
FIG. 11B re-presents the example decomposition video frame of FIG. 1B.
Figure 11C:
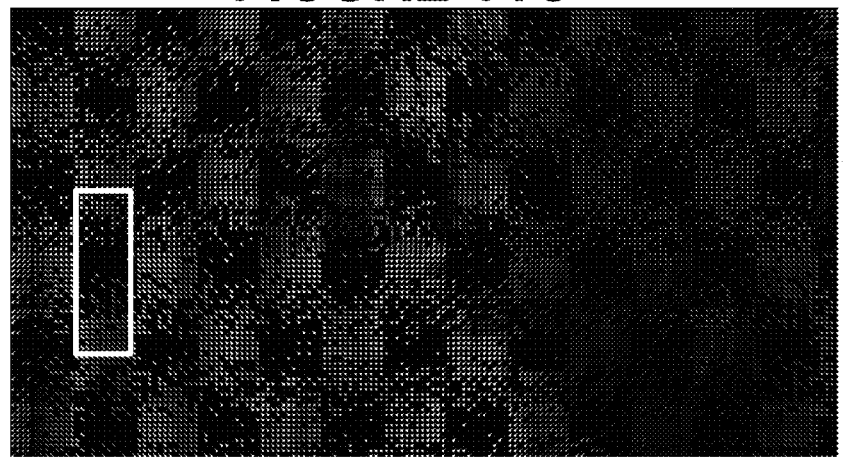
FIG. 11C represents the decomposition video frame produced by applying, to FIG. 11B, a complementary srl-level selection function.

For example, FIGS. 11A and 11B correspond to, respectively, FIGS. 1A and 1B. FIG. 11 also includes a FIG. 11C, where FIG. 11C represents the decomposition video frame produced by applying, to FIG. 11B, a complementary srl-level selection function. Both FIGS. 11B and 11C reflect application, at the srh-level, of a four-way selection function (i.e., these figures reflect the use of square, 2 vixel by 2 vixel, srh type regions). Thus, in this case, the resulting decomposition video is comprised of four pairs of frames, for a total decomposition video frame-length of eight frames.

To further emphasize the complementary nature of FIGS. 11B and 11C, a same srh type region is indicated in both figures by a white rectangular box. To the left of the box placed in FIG. 11B, is an example sawtooth srl-level function 1100, by which the contents of the box could be produced. By close examination, it can be seen that the corresponding white rectangular box in FIG. 11C reflects opposite choices, as to whether a pixel of the input image is to be included.

FIG. 12 depicts a typical usage scenario, where a person 1200 wishes to communicate a photograph to person 1201. For example, the photograph to be transmitted could be the photograph already discussed with respect to FIGS. 1A and 11A. Person 1200 has possession of a smart phone 1210, by which she would like to transmit the photo to smart phone 1211, where smart phone 1211 is in possession of person 1201. The photograph to be transmitted could be, for example, a "selfie" that person 1200 has taken of herself, using the built-in camera of smart phone 1210.

As can be seen, smart phone 1210 has a wireless connection 1220, to a local base station 1230. Similarly, smart phone 1211 has a wireless connection 1221, to its local base station 1231. Base stations 1230 and 1231 each connect, respectively, by data network links 1240 and 1241, two wide area network 1250 (such as the Internet).

FIG. 13 continues with this usage scenario by showing close-up views of smart phones 1210 and 1211. As can be seen, smart phone 1210 is displaying on its screen the original input image, as taken by person 1200. This is the same photograph already discussed with respect to FIGS. 1A and 11A. The connection between smart phone 1210 and 1211 is summarized, for purposes of FIG. 13, as wireless link 1300. Therefore, some short time period, after the photo has been transmitted, essentially the same photograph is viewed by person 1201 on smart phone 1211. However, it is assumed that on smart phone 1211, the photograph is being displayed through a "privacy and control" app, constructed in accordance with the principles of the present invention. Therefore, while the image shown on smart phone 1211 appears to be a static image, it is, in fact, a result of the continuous display of a decomposition video. For example, as has just been discussed above with respect to FIG. 11, the image seen on smart phone 1211 could be the result of playing, as a continuous loop, an eight frame decomposition video.

Sometime later person 1201 decides that she would like to keep a copy of the photo sent to her, and she uses the facility of her smart phone's operating system, to take a screenshot. FIG. 13 shows a second view of smart phone 1211, labeled in the figure as smart phone 1211' (note the apostrophe appended, to the end of 1211). Smart phone 1211' shows what person 1201 would see, when she attempts to view her screenshot.

7 Hardware Implementation

Figure 14:
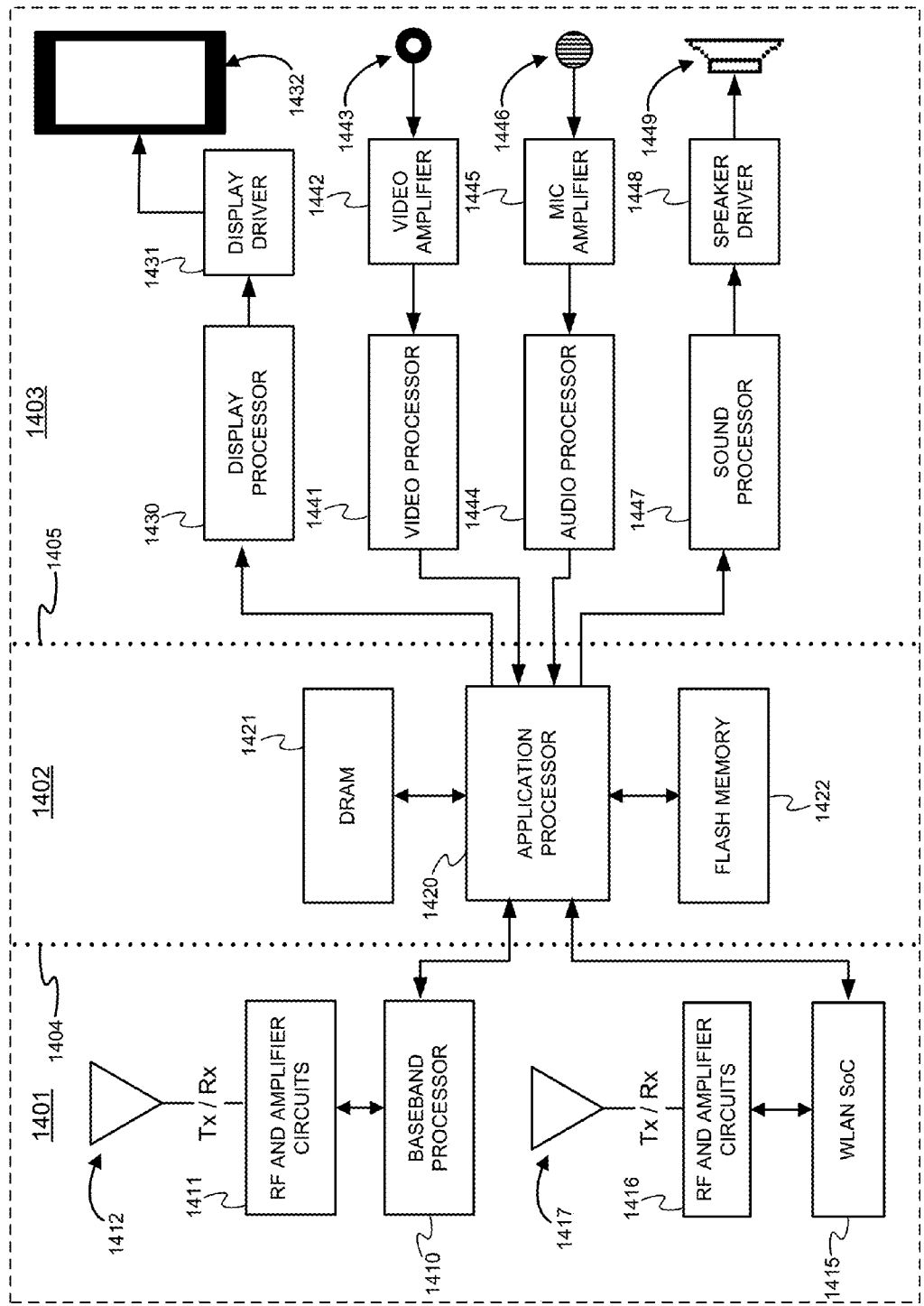
FIG. 14 presents one example hardware implementation for a smart phone.

FIG. 14 presents one example hardware implementation for a smart phone.

As can be seen, the example hardware is divided into three main sections, labeled 1401, 1402, and 1403. Each of these sections is now discussed in turn.

Section 1401 represents the radio frequency hardware. It includes an antenna 1412, RF and amplifier circuits 1411, and a baseband processor 1410. Section 1401 is responsible for both receiving and transmitting WWAN signals, through antenna 1412. An example suitable form of WWAN signal is GSM/GPRS, as developed by the European Telecommunications Standards Institute.

In some circumstances, it can be useful for the wireless part, of WWAN, to be implemented with a WLAN technology (like IEEE 802.11 family of signal standards). This option is represented by System-on-Chip 1415, RF circuits 1416, and antenna 1417.

Section 1402 represents the programmable hardware of a smart phone. It is often implemented with a suitably programmed application processor 1420, that utilizes both volatile (e.g., DRAM 1421), and non-volatile (e.g., flash memory 1422) memory.

Section 1403 represents the hardware of a smart phone that is responsible for producing outputs or receiving sensory inputs.

For example, photos are actually displayed, to a smart phone user, by digital display screen 1432. A typical current resolution for an APPLE IPHONE display screen is 640 pixels×1136 pixels. Display screen 1432 is powered by display drivers 1431, and the display drivers power the display in response to control signals from display processor 1430. Display processor 1430 forms the kind of peripheral, as it is seen by application processor 1420.

Photos can be taken with an input camera 1443. The camera's output can first be amplified by a video amplifier 1442 and then packaged, into a digital format suitable for processing by application processor 1420, by video processor 1441.

Of course, it is necessary for a phone to have a microphone 1446 and speaker 1449. The output of microphone 1446 can first be amplified by microphone amplifier 1445, and then packaged, into a digital format suitable for processing by application processor 1420, by audio processor 1444. Power for speaker 1449 can be produced by speaker drivers 1448, with sound processor 1447 serving to make speaker 1449 a suitable peripheral of application processor 1420.

A privacy and control app, constructed in accordance with the principles of the present invention, can reside in flash memory 1422, and be executed upon application processor 1420.

The hardware of FIG. 14 will first be considered from the perspective of a user such as person 1200, discussed above, who has taken a photo with her smart phone, and wishes to send it to another. In this case, photos taken with input camera 1443 can be converted into a decomposition video (by the application processor operating in accordance with the installed app) prior to their even leaving the physical confines of the smart phone itself.

The hardware of FIG. 14 will now be considered from the perspective of a user such as person 1201, who has received the frames of the decomposition video. A "player" portion, of the installed privacy and control app as installed on her smart phone, displays the decomposition video on her display screen 1432.

More generally, any type of computer upon which the techniques of the present invention can be implemented, will, in accordance with what is ordinarily known by those in the art, contain computational hardware (e.g., integrated circuits), and programmable memories (volatile and/or non-volatile), of various types.

Computational hardware, whether in integrated circuit form or otherwise, is typically based upon the use of transistors (field effect and/or bipolar), although other types of components (e.g., optical, microelectromechanical, or magnetic) may be included. Any computational hardware has the property that it will consume energy, as a necessary part of being able to perform its function. Also, regardless of how quickly it can be made to operate, computational hardware will require some amount of time to change state. Because of its basis on physical devices (electronic or otherwise), computational hardware, however small, will occupy some amount of physical space.

Programmable memories are subject to the same physical limitations described above for computational hardware. A programmable memory is intended to include devices that use any kind of physics-based effects or properties, in order to store information in at least a non-transitory way, and for an amount of time commensurate with the application. The types of physical effects used to implement such storage, include, but are not limited to: maintenance of a particular state through a feedback signal, charge storage, changes to optical properties of a material, magnetic changes, or chemical changes (reversible or irreversible).

Unless specifically indicated otherwise, the terms computational hardware, programmable memory, computer-readable media, system, and sub-system, do not include persons, or the mental steps a person may undertake.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored and/or from which a defined unit of information can be retrieved.

8 Glossary of Selected Terms

Application Program (or "app"): Any program intended to have a particular area of use or applicability. Generally has at least some provision for interaction with one or more users. Application programs are often distinguished against programs like an "operating system" (by which the operation of an application program is controlled) or other tools involved in the execution of an application program (such as a compiler or interpreter).
dv: Abbreviation for decomposition video.
dv_max: Given a particular display technology, represents the maximum number of frames that can be included in the decomposition video, while still producing a net image, one played, that appears smooth and static.
dv_nf: Represents the number of frames in a decomposition video.
fps: frames per second.
pixel: As used herein, a pixel is the smallest unit for processing, in accordance with the techniques of the present invention. In some cases, this pixel size may correspond to the actual pixel size of the screen for display. In other cases, a single pixel may correspond to several pixels in the display screen. For example, a single pixel could represent for pixels of the display screen, in which case, for example, a micro-block comprised of 2×2 pixels is, in pixels of the display screen, of size 4×4.
pseudo-code: The pseudo-code shown herein is based loosely on the "C" programming language.
resolution: The number of pixels in the input image. Given current resolutions, that are widely used across different types of digital displays, it is common to refer to a display's resolution in units of "megapixels" (or millions of pixels).
second: As a unit of time, can be abbreviated herein as "sec."
srh: Abbreviation for a subregion of an input image, where the subregion has been selected in order to filter higher frequency spatial frequencies.
srl: Abbreviation for a subregion of an input image, where the subregion has been selected in order to filter lower frequency spatial frequencies.
vixel: An abbreviation for "virtual pixel," a vixel can be made of just one pixel, or it can contain two or more pixels, so long as the pixels form a continuous region.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for processing an input image, comprising:
selecting, performed at least in part with a configuration of computing hardware and programmable memory, vixel subsets of the input image, such that each subset is, at least, substantially disjoint from any other subset selected;
selecting, performed at least in part with a configuration of computing hardware and programmable memory, vixel subsets of the input image, such that a union of the subset contains all the vixels of the input image;
selecting, performed at least in part with a configuration of computing hardware and programmable memory, a first set of vixel subsets in accordance with subregions of the input image of a first type, that are sized to provide higher-frequency spatial frequency filtering;
selecting, performed at least in part with a configuration of computing hardware and programmable memory, two or more subsets, from each member of the first set of vixel subsets, in accordance with subregions of the input image of a second type, that are sized to provide lower-frequency spatial frequency filtering; and
playing as a sequence of frames, performed at least in part with a configuration of computing hardware and programmable memory, each of the two or more subsets formed, from each member of the first set of vixel subsets.

2. A system for processing an input image, comprising:
one or more processors and programmable memory, wherein the system is configured:
to accomplish selecting vixel subsets of the input image, such that each subset is, at least, substantially disjoint from any other subset selected;
to accomplish selecting vixel subsets of the input image, such that a union of the subset contains all the vixels of the input image;
to accomplish selecting a first set of vixel subsets in accordance with subregions of the input image of a first type, that are sized to provide higher-frequency spatial frequency filtering;
to accomplish selecting two or more subsets, from each member of the first set of vixel subsets, in accordance with subregions of the input image of a second type, that are sized to provide lower-frequency spatial frequency filtering; and
to accomplish playing as a sequence of frames each of the two or more subsets formed, from each member of the first set of vixel subsets.

3. A system for processing an input image, comprising:
a sub-system configured, as a result of the computing hardware and programmable memory, to accomplish selecting vixel subsets of the input image, such that each subset is, at least, substantially disjoint from any other subset selected;
a sub-system configured, as a result of the computing hardware and programmable memory, to accomplish selecting vixel subsets of the input image, such that a union of the subset contains all the vixels of the input image;

a sub-system configured, as a result of the computing hardware and programmable memory, to accomplish selecting a first set of vixel subsets in accordance with subregions of the input image of a first type, that are sized to provide higher-frequency spatial frequency filtering;

a sub-system configured, as a result of the computing hardware and programmable memory, to accomplish selecting two or more subsets, from each member of the first set of vixel subsets, in accordance with subregions of the input image of a second type, that are sized to provide lower-frequency spatial frequency filtering; and a sub-system configured, as a result of the computing hardware and programmable memory, to accomplish playing as a sequence of frames each of the two or more subsets formed, from each member of the first set of vixel subsets.

4. The method of claim 1, further comprising the following step:

selecting the two or more subsets, from each member of the first set of vixel subsets, in accordance with at least a first probabilistic selection function.

5. The method of claim 4, wherein the first probabilistic selection function has a finite slope, when transitioning from a first minimum probability to a first maximum probability.

6. The method of claim 4, wherein the probabilistic selection function has an approximately infinite slope, when transitioning from a first minimum probability to a first maximum probability.

7. The method of claim 5, wherein the first probabilistic selection function follows a sawtooth waveform pattern.

8. The method of claim 1, further comprising the following step:

selecting two subsets, from each member of the first set of vixel subsets, in accordance with a first probabilistic selection function and the inverse of the first probabilistic selection function.

9. The method of claim 1, further comprising the following steps:

selecting three subsets, from each member of the first set of vixel subsets, in accordance with a first, second, and third probabilistic selection function; and varying each of the first, second, and third probabilistic selection functions in a sinusoidal pattern, in accordance with a first dimension of subregions of the second type.

10. The method of claim 1, wherein the step of selecting the first set of vixel subsets further comprises:

selecting each subset, of the first set of vixel subsets, by selecting a different vixel from each subregion of the first type.

11. The method of claim 1, wherein each subregion of the second type encompasses an area of the input image that is, approximately, two to three orders of magnitude larger than the area encompassed by each subregion of the first type.

12. The method of claim 1, wherein subregions of the first type are at least substantially nonoverlapping and fit together, across an area of the input image, in accordance with a repetitive pattern.

* * * * *